US007120645B2

(12) United States Patent
Manikutty et al.

(10) Patent No.: US 7,120,645 B2
(45) Date of Patent: Oct. 10, 2006

(54) TECHNIQUES FOR REWRITING XML QUERIES DIRECTED TO RELATIONAL DATABASE CONSTRUCTS

(75) Inventors: Anand Manikutty, Foster City, CA (US); Muralidhar Krishnaprasad, Fremont, CA (US); Ravi Murthy, Fremont, CA (US); Zhen Liu, San Mateo, CA (US); Subramanian Muralidhar, Fremont, CA (US); James Warner, Sunnyvale, CA (US); Sivasankaran Chandrasekar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/428,878

(22) Filed: May 1, 2003

(65) Prior Publication Data

US 2004/0064466 A1 Apr. 1, 2004

Related U.S. Application Data

(63) Continuation-in-part of application No. 10/259,278, filed on Sep. 27, 2002.

(51) Int. Cl.
*G06F 17/30* (2006.01)

(52) U.S. Cl. .................................................... 707/102

(58) Field of Classification Search .............. 707/1–10, 707/100–102, 103–104.1; 717/106
See application file for complete search history.

(56) References Cited

U.S. PATENT DOCUMENTS 5,404,513 A 4/1995 Powers et al.
5,878,415 A 3/1999 Olds
5,974,407 A 10/1999 Sacks (Continued)

OTHER PUBLICATIONS

Peng, Feng et al., Xpath queries on streaming data, 2003, ACM Press, pp. 4321–4442.*

Jean–Yes Vio–Dury, Xpath on left and right sides of rules: toward compact XML tree rewriting through node patterns, 2003, ACM Press, pp. 19–25.*

Dayen, I., "Storing XML in Relational Databases", *XML.com* XP–002275971(1998–2004) pp. 1–13.

Funderbunk, J. et al., "XML programming with SQL/XML and XQuery", *IBM Systems Journal* XP–002295973 (2002) pp. 642–665.

(Continued)

*Primary Examiner*—Diane D. Mizrahi
(74) *Attorney, Agent, or Firm*—Hickman Palermo Truong & Becker LLP

(57) ABSTRACT

Techniques for executing database commands include receiving a database command that includes an XML component operation that operates on an XML construct that is based on a first set of one or more relational database constructs. It is determined whether the XML component operation can be transformed to a relational database operation on a particular set of one or more relational database constructs of the first set, which does not involve the XML component operation. If it is determined that the XML component operation can be transformed, then the XML component operation is rewritten as a particular relational database operation that operates on the particular set and that does not involve the XML component operation. The particular relational database operation is evaluated. In another aspect, techniques include determining a primitive set of XML generation operations and replacing non-primitive XML generation operations with one or more operations from the primitive set.

48 Claims, 6 Drawing Sheets

U.S. PATENT DOCUMENTS

| | | | | | |
|---|---|---|---|---|---|
| 5,987,506 | A | | 11/1999 | Carter et al. | |
| 6,038,563 | A | | 3/2000 | Bapat et al. | |
| 6,055,544 | A | | 4/2000 | DeRose et al. | |
| 6,061,684 | A | | 5/2000 | Glasser et al. | |
| 6,128,610 | A | | 10/2000 | Srinivasan et al. | |
| 6,141,655 | A | | 10/2000 | Johnson et al. | |
| 6,154,741 | A | | 11/2000 | Feldman | |
| 6,199,195 | B1 | | 3/2001 | Goodwin et al. | |
| 6,208,993 | B1 | | 3/2001 | Shadmon | |
| 6,263,332 | B1 | | 7/2001 | Nasr et al. | |
| 6,269,380 | B1 | | 7/2001 | Terry et al. | |
| 6,279,006 | B1 | | 8/2001 | Shigemi et al. | |
| 6,298,349 | B1 | | 10/2001 | Toyoshima et al. | |
| 6,343,287 | B1 | | 1/2002 | Kumar et al. | |
| 6,356,920 | B1 | | 3/2002 | Vandersluis | |
| 6,366,934 | B1 | | 4/2002 | Cheng et al. | |
| 6,470,344 | B1 | | 10/2002 | Kothuri et al. | |
| 6,487,546 | B1 | | 11/2002 | Witkowski | |
| 6,496,842 | B1 | | 12/2002 | Lyness | |
| 6,708,186 | B1 | | 3/2004 | Claborn et al. | |
| 6,772,350 | B1 | | 8/2004 | Belani et al. | |
| 6,785,673 | B1 | | 8/2004 | Fernandez et al. | |
| 6,836,778 | B1 | * | 12/2004 | Manikutty et al. | 707/102 |
| 2001/0037345 | A1 | | 11/2001 | Kieman et al. | |
| 2003/0009361 | A1 | | 1/2003 | Hancock et al. | |
| 2003/0065659 | A1 | | 4/2003 | Agarwal et al. | |
| 2003/0093672 | A1 | | 5/2003 | Cichowlas | |
| 2003/0140308 | A1 | | 7/2003 | Murthy et al. | |
| 2003/0182624 | A1 | | 9/2003 | Large | |
| 2004/0064466 | A1 | | 4/2004 | Manikutty et al. | |
| 2004/0088415 | A1 | | 5/2004 | Chandrasekar et al. | |
| 2004/0220912 | A1 | * | 11/2004 | Manikutty et al. | 707/3 |
| 2004/0220927 | A1 | * | 11/2004 | Murthy et al. | 707/4 |
| 2004/0230667 | A1 | | 11/2004 | Wookey | |
| 2005/0010896 | A1 | * | 1/2005 | Meliksetian et al. | 717/106 |

OTHER PUBLICATIONS

Hierarchical Queries, XP–002295972, pp. 8–3 to 8–7.

PCT/US2004/010018—International Search Report and Written Opinion (14 pages).

PCT/US2004/010018—current claims.

Josephine Cheng, et al., "IBM DB2 XML Extender, An end–to–end solution for storing and retrieving XML documents," IEEE, ICDE '00 Conference, San Diego, Feb. 2000, 128 pages.

Jim Melton, "ISO–ANSI Working Draft, XML–Related Specifications (SQL/XML)," WG3: DRS–020, H2–2002–365, Aug. 2002, 154 pages.

Oracle Corporation, "Oracle9i XML Database Developer's Guide—Oracle XML DB," Release 2 (9.2), Mar. 2002, Part No. A96620–1, pp. 5–8–5–10, 5–21–5–24, 5–52–5–70, 10–5–10–20 and 11–1–11–20.

W3C, "XML Schema Part 1: Structures," W3C Recommendation, May 2, 2001, http://www.w3.org/TR/2001/REC–xmlschema–1–20010502/, pp. 1–203 (text provided on CD–ROM).

W3C, "XML Schema Part 2: Datatypes," W3C Recommendation, May 2, 2001, http://www.w3.org/TR/2001/REC–xmlschema–2–20010502/, pp. 1–146 (text provided on CD–ROM).

R. Bourret et al.: A generic Load/Extract Utility for Data Transfer Between XML Documents and Relational Databases, Jun. 8–9 2000, IEEE computing SOC., pp. 134–143.

* cited by examiner

TECHNIQUES FOR REWRITING XML QUERIES DIRECTED TO RELATIONAL DATABASE CONSTRUCTS

CROSS REFERENCE TO RELATED APPLICATION

This application claims benefit as a Continuation-in-part of application Ser. No. 10/259,278, filed Sep. 27, 2002, (hereinafter referenced as Murthy-1) the entire contents of which are hereby incorporated by reference as if fully set forth herein, under 35 U.S.C. §120.

This application is related to application Ser. No. 10/428,443, filed May 1, 2003, (hereinafter referenced as Murthy-2) the entire contents of which are hereby incorporated by reference as if fully set forth herein.

FIELD OF THE INVENTION

The present invention relates to techniques for using eXtensible Markup Language (XML) data in a relational database system.

BACKGROUND OF THE INVENTION

The World Wide Web (WWW) involves a network of servers on the Internet, each of which is associated with one or more Hypertext Markup Language (HTML) pages. The HTML pages are transferred between clients that make requests of servers and the servers using the Hypertext Transfer Protocol (HTTP). Resources available from servers on the Internet are located using a Universal Resource Locator (URL). The standards and protocols of the WWW are promulgated by the World Wide Web Consortium (W3C) through its servers at www.w3c.org, and are used on many private networks in addition to their use on the Internet.

The HTML standard is one application of a more general markup language standard called the Standard Generalized Markup Language (SGML). Recently, a subset of SGML that is more powerful and flexible than HTML has been defined and has gained popularity for transferring information over the Internet and other networks. The new standard, developed and promoted by W3C, is called the eXtensible Markup Language (XML). XML provides a common syntax for expressing structure in data. Structured data refers to data that is tagged for its content, meaning, or use. XML provides an expansion of the tagging that is done in HTML, which focuses on format or presentation. XML tags identify XML elements and attributes of XML elements. XML elements can be nested to form hierarchies of elements.

A set of syntax rules for XML elements shared by multiple XML documents is defined by an XML schema, itself an XML document. For example, the syntax rules indicate what elements can be used in a document, in what order they should appear, which elements can appear inside other elements, which elements have attributes, what those attributes are, and any restrictions on the type of data or number of occurrences of an element. XML allows documents to contain elements from several distinct XML schema by the use of namespaces. In particular, elements from other, independently created XML schema can be interleaved in one XML document.

Given the elements defined and used by XML, a document object model (DOM) is a tree structure formed to define how the information in an XML document is arranged. The DOM is navigated using an XPath expression that indicates a particular node of content in the hierarchy of elements and attributes in an XML document. XPath is a standard promulgated by W3C.

Relational databases predate, and developed independently of, the World Wide Web. Relational databases store data in various types of data containers that correspond to logical relationships within the data. As a consequence, relational databases support powerful search and update capabilities. Relational databases typically store data in tables of rows and columns where the values in all the columns of one row are related. For example, the values in one row of an employee table describe attributes of the same employee, such as her name, social security number, address, salary, telephone number and other information. Each attribute is stored in a different column. Some attributes, called collections, can have multiple entries. For example, the employee may be allowed to have multiple telephone numbers. Special structures are defined in some relational databases to store collections.

A relational database management system (DBMS) is a system that stores and retrieves data in a relational database. The relational DBMS processes requests to perform database functions such as creating and deleting tables, adding and deleting data in tables, and retrieving data from the tables in the database. A well-known standard language for expressing the database requests is the Structured Query Language (SQL).

Object-relational databases extend the power of relational databases. Object-relational databases allow the value in a column to be an object, which may include multiple attributes. For example, the value in the address column may be an address object that itself has multiple attributes, such as a street address, a city, a state, a country, and a zip code or equivalent. An object type defines the attributes of an object in an object-relational database. SQL has been extended to allow the definition and use of objects and object types in object-relational databases. As used hereinafter, the term "object-relational database" refers to a subset of relational databases that support object-relational constructs; and an object-relational construct is one example of a relational construct.

Because of the popularity of XML as a data exchange format that supports hierarchical relationships among elements, and because of the power of relational DBMSs to update and retrieve data, there is a demand for generating XML data output from relational databases and storing XML data into relational databases. To support this demand, an industry standard SQL to operate on XML documents has been developed. This standard is called SQL/XML and documents relating to SQL/XML are available at the time of this writing at www.sqlx.org. As used in the following, XML constructs include XML elements, XML attributes, XML documents (which always have a single root element), and document fragments that include multiple elements at the root level; object relational constructs include such constructs as tables, rows, columns, objects and views.

Recent work, described in Murthy-1., has been directed to mechanisms for mapping XML constructs in an XML schema, to constructs in an object-relational DBMS Murthy-1. also describe mechanisms for storing XML content into the appropriated object-relational construct. One or more object-relational constructs that correspond to all or part of an XML construct are associated with an XML type. These mechanisms support various options for storing the XML type, from storing the entire document as a single featureless large object in the database (e.g., a character large object, CLOB, of the ORACLE™ DBMS available from Oracle International Corporation, of Redwood Shores, Calif.) to storing one or more XML elements as one or more simple or object type columns or collections in one or more tables.

An SQL/XML query may include XPath based operations such as EXTRACT, EXISTNODE, and EXTRACTVALUE, which operate on a portion of an XML construct indicated by an XPath expression provided as an argument to the operator. EXISTNODE returns one value (e.g., 0) if there is no XML element at the position in the hierarchy indicated by the XPath expression, and a different value (e.g., 1) otherwise. EXTRACT returns a data stream representing a portion of the XML construct at nodes in the hierarchy of the XML construct that include and descend from the XML element or elements indicated by the XPath expression. EXTRACTVALUE returns a scalar value, if any, from the XML element indicated by the XPath expression.

When a query with an XPath based operation is directed to an XML type, the SQL/XML DBMS may convert the stored data to its XML form and then send the XML form of the data to the process that implements the XPath operation. The XPath operation process parses the data to identify and return the indicated information. This process can be wasteful if only a portion of the XML construct, stored separately in one or more columns of a relational or object-relational database, affects the results. It would be desirable to extract only data from the columns of interest with an SQL query. In addition, the use of an SQL query enables further SQL optimizations that fully exploit the object-relational storage. Such optimization may not be available during parsing by an XPath operation.

Based on the foregoing, there is a clear need for a mechanism to rewrite a query with an XPath operation, directed to an XML type object-relational construct, as an SQL query Many database owners have large amounts of data already stored in legacy databases that did not define object-relational constructs that correspond closely to XML constructs. For such users to operate on XML data, the object-relational constructs have to be related to XML constructs, before XPath based queries can be evaluated.

One approach to making legacy relational and object-relational databases available for XPath based queries is to migrate the entire database to a different database that supports XML. This approach involves converting the relational or object-relational data into XML format, such as by writing and executing a procedure to do the conversion, and storing the resulting XML constructs in a native XML database, such as the ORACLE™ XMLDatabase. However, such data migration may be expensive; and costs may exceed a database owner's willingness or ability to pay for the migration.

Another approach is to retrieve data from the database using relational or object-relational queries from a mid-tier application separate from the database server; and modify the mid-tier application to form and manipulate XML constructs. This approach can also be expensive, because the application must be modified. Also, this approach may be inefficient in that more data is often exported to the mid tier than is used in the results after the XML constructs are manipulated. This wastes communication bandwidth, wastes the processing resources at the database server to retrieve and send the excess data, and wastes the processing resources at the application to convert the excess data to XML constructs.

A SQL/XML DBMS, for example ORACLE™ XML Database, may allow a view of XML type to be defined based on one or more underlying tables. A view is a relational database construct for a stored query that generates a set of rows with columns from one or more tables, when a query directed to the view is executed. The query stored in the view becomes a sub-query of the query directed to the view. An XML type view is a stored query that generates a data stream of XML elements of the associated type from columns in one or more tables, when a query directed to the view is executed. XML type views can be used to generate XML data from legacy data stored in relational and object-relational constructs.

A SQL/XML DBMS, may allow some queries to include an XPath portion and a second portion, called a "sub-query" that produces an XML type. The XML type sub-query might not be stored as a view, but also generates a data stream of XML elements. As used hereinafter an XML type sub-query refers to a sub-query that generates a stream of XML elements, whether or not the sub-query is stored as a XML type view.

It would be desirable if, in some circumstances, the XML query directed to the XML type sub-query would be rewritten as one or more SQL queries on the underlying object-relational constructs. Rewriting XML queries as SQL queries avoids composing the data into an XML data stream and then parsing the XML stream during an XPath operation. Avoiding such composing and parsing saves computational resources and enhances performance. In addition, rewriting XML queries as SQL queries also allows SQL optimizations of the rewritten SQL query to fully exploit the object-relational storage, such as the use of indexes.

Based on the foregoing, there is a clear need for a mechanism to rewrite a query with an XPath operator directed to an XML type sub-query as an SQL query.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
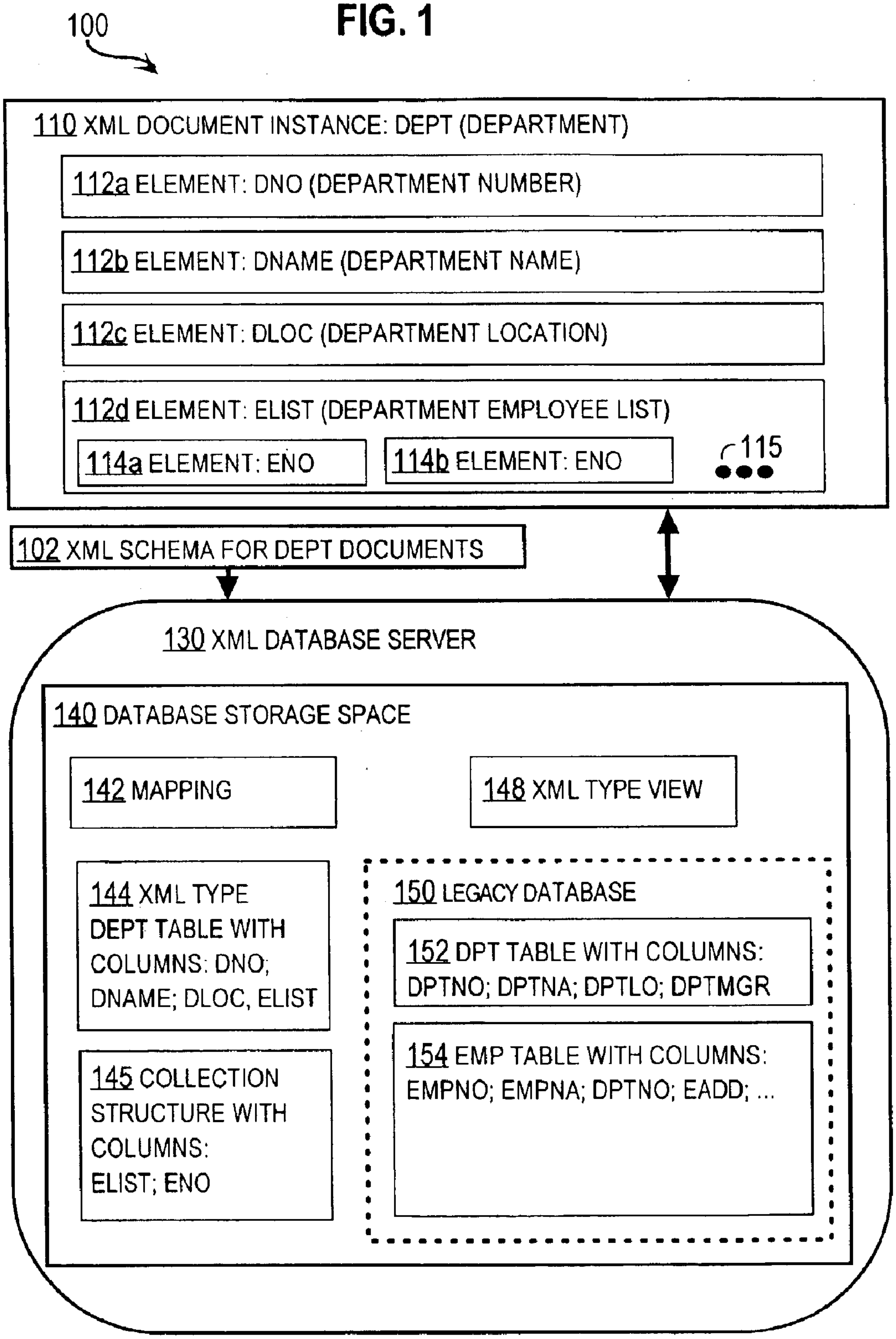
FIG. 1 is a block diagram that illustrates an XML document, an XML schema, and object-relational constructs that store XML construct contents in an object-relational database, according to an embodiment.

Techniques are described for executing database commands that involve operations on XML constructs for XML documents that are based on relational database constructs. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one aspect of the invention, a technique for executing database commands that involve operations on XML constructs includes receiving the database command. It is then determined whether an XML component operation in the database command can be transformed to a relational database operation, which operates on a particular set of one or more relational database constructs, and which does not involve the XML component operation. If it is determined that the XML operation can be transformed, then the XML component operation is rewritten to a particular relational database operation that does not involve the XML component operation. The particular relational database operation on the particular set of one or more relational database constructs is evaluated.

This technique allows a database management system (DBMS) to employ the efficiencies in relational database storage, and therefore this technique often greatly enhances database performance. This technique also allows a DBMS to avoid generating XML elements and parsing those elements in an XML processor when the elements contribute nothing to the outcome of the query. Avoiding such excess generation and parsing further enhances database performance.

According to another aspect of the invention, a technique for executing database commands that involve generating an XML type from relational database constructs includes determining a primitive set of XML generation operations for generating any XML construct from any relational database construct. It is determined whether a database command involves a particular XML generation operation that is not a member of the primitive set. If it is determined that the database command involves the particular XML generation operation that is not a member of the primitive set, then a particular set of one or more XML generation operations from the primitive set is determined that produces the same result as the particular XML generation operation. The particular set of one or more primitive XML generation operations is used instead of the non-primitive operation to evaluate the database command.

This technique allows a DBMS to employ simpler rules for determining when XML components contribute nothing to the outcome of a database command or when XML component operations can be replaced by SQL operations. The technique therefore allows the DBMS to more easily determine when to avoid generating excess XML elements that have to be parsed in an XML processor and when to replace XML operations with SQL operations that can be executed more efficiently in a database. Avoiding such excess generation and parsing and using more SQL operations can often greatly enhance database performance.

Embodiments are described in the following in the context of a commercial extensible markup language/structured query language (XML/SQL) database server, which uses object-relational constructs for storage of content for one or more XML constructs, and which responds to XPath queries for that content to be output as one or more XML constructs. XPath queries involve an XPath expression to locate data in an XML construct and zero or more XPath based functions to produce, combine or compare data located by an XPath expression. XPath standard functions include EXTRACT, EXTRACTVALUE, AND NODESEXIST, described in above in the Background section. However, the invention is not limited to this context, but may be applied in any context involving relational database constructs and XML data.

For example, embodiments may be employed in an XML database that uses relational database constructs but not object-relational constructs; or an XML database that uses relational database commands that do not conform to SQL. Embodiments may be employed in an XML/SQL database that is accessed through an application programming interface (API) rather than being accessed as a server that responds to messages sent over a network. In some embodiments, the database command may include data manipulation language (DML) operations to change contents stored in the database, or may include data definition language (DDL) operations to change the relational database constructs used to store the XML or non-XML contents.

In some embodiments, another syntax different from XPath may be used to express locations of data within an XML construct; and XML operations different from XPath based functions may be used to combine or compare data located in an XML construct. For example, an object notation (in which levels in an object hierarchy are indicated by dots between object names) may be used to express an object-relational data item that corresponds to an XML element or attribute instead of XPath notation (in which levels in an XML hierarchy are indicated by slashes "/" between element names); and the object notation may be used as an argument for an XPath based function or some other function that operates on data from an XML construct.

Some embodiments of these aspects produce advantages over the mid-tier approach. Fetching all the data into the mid-tier can be a waste of resources, since this approach might entail having to fetch all the data into the mid-tier before XML manipulation can be performed. It is often not feasible to build a good query optimizer in the mid-tier since the optimizer needs to be aware of costs, statistics and other information for query optimization, which are usually present in the database instead of the mid-tier.

Some embodiments of these aspects produce advantages over the data migration-based approach. Data does not need to be migrated in order to make it available to XML manipulation tools. If the data is migrated to non-schema-based XML type tables, then XPath queries over the relational data still involve the entire XML to be manifested, and DOM operations to be carried out on the manifested XML. Querying XML data in such a manner can be prohibitively expensive.

When queries are rewritten to an object-relational form, the queries can be efficiently optimized using relational and object-relational techniques. Traditional object-relational access methods, such as B-Tree indexes, can be used to efficiently access the data. This can lead to orders of magnitude improvement in performance over previous approaches.

Structural Overview

Structures involved in embodiments of the invention include XML constructs and relational database constructs. FIG. 1 is a block diagram that illustrates an example XML document 110, an example associated XML schema 102, and example object-relational constructs that store XML construct contents in an object-relational database managed by an object-relational database server 130.

XML document 110 is an instance of a particular XML document type, called hereinafter a "DEPT" XML document, which describes a department of an enterprise. For purposes of illustration it is assumed that an example DEPT document 110 includes an XML element 112*a* (named "DNO") for a department number, an XML element 112*b* (named "DNAME") for a department name, an XML element 112*c* (named "DLOC") for a department location, and an XML element 112*d* (named "ELIST") for a list of employees in the department. The element ELIST 112*d* includes elements 114*a*, 114*b* and others indicated by ellipsis 115 (named "ENO") for an employee number, collectively referenced hereinafter as ENO elements 114. The full text representation of the XML document 110, with tags, is indicated, in part, in Table 1. XML tags appear inside angle brackets "<" and ">"; the end of an XML element is indicated by a slash "/". For purposes of illustration, values are given for each element. The ellipses in lines 1 and 13 indicate other lines of XML text not shown in Table 1.

TABLE 1

Portion of full text representation of XML document

| line number | XML text |
|---|---|
| 1 | ... |
| 2 | <DEPT> |
| 3 | <DNO> 101 </DNO> |
| 4 | <DNAME> Human Resources, Corp. </DNAME> |
| 5 | <DLOC> |
| 6 | 1000 Main St, Centerville, MO, 11111-2222, USA |
| 7 | </DLOC> |
| 8 | <ELIST> |
| 9 | <ENO> 0017 </ENO> |
| 10 | <ENO> 1897 </ENO> |
| 11 | <ENO> 0112 </ENO> |
| 12 | <ENO> 3211 </ENO> |
| 13 | ... |
| 14 | </ELIST> |
| 15 | </DEPT> |

The DEPT type may be described in an XML schema document such as XML schema 102. For example, the XML schema 102 lists several child elements of documents of type DEPT, which include mandatory elements DNO, DNAME, DLOC and ELIST. XML schema 102 indicates what type of information is stored in each of these elements and what attributes each element has. An example attribute is an element name. Information types may include, for example, character data, numeric data, and another element, among other types of information. For example, element ELIST may include one or more other elements having element name ENO.

Example XML database server 130 is an object-relational database server, which imports and exports XML constructs, and which stores contents for the XML constructs in one or more object-relational constructs in database storage space 140.

For example, XML Database Server 130 stores a mapping 142 between XML elements or attributes and one or more objects of XML type. In some embodiments, as described in Murthy-1., the mapping includes an XML schema with optional notations that indicated object-relational construct properties. For example, documents of type DEPT are associated with rows in a DEPT table 144. The DEPT table has columns that correspond to the child elements of DEPT XML documents. Although the methods of Murthy-1. allow the column names to differ from the element names, for simplicity in the illustrated embodiment, the column names in Table 144 are the same as the element names in DEPT type XML documents. For example, table 144 has columns named DNO, DNAME, DLOC and ELIST.

The methods of Murthy-1. allow the element ELIST to be treated as a collection of sub-elements rather than as a large opaque object such as a large object (LOB) or a character large object (CLOB). Collection structures in some object-relational databases include variable arrays and nested tables. The collection structure for one ELIST may be stored within table 144 ("in line") as a series of columns within the column named ELIST or in a separate table ("out of line"). In the illustrated embodiment, the ELIST is stored as an out of line collection in collection structure 145, such as a table of variable arrays. When stored out of line, the ELIST column of table 144 indicates which rows of the separate collection structure correspond to a particular row in table 144. For example, the value in the ELIST column of table 144 is repeated in the ELIST column of table 145 in each row of table 145 associated with one row in table 144.

Sample rows in tables 144, 145 are listed in Table 2, and Table 3, respectively. For purposes of illustration, values are given for XML document 110 as well as other XML documents of type DEPT.

TABLE 2

Portion of DEPT table

| row | DNO | DNAME | DLOC | ELIST |
|---|---|---|---|---|
| 1 | 100 | Corporate | 1000 Main St, Centerville, MO, 11111-2222, USA | 1234 |
| 2 | 101 | Human Resources, Corp. | 1000 Main St, Centerville, MO, 11111-2222, USA | 1235 |
| 3 | 105 | SALES | 52 Fifth Ave., New York, NY, 10000-9999, USA | 1236 |

TABLE 3

Portion of variable array table

| row | ELIST | ENO |
|---|---|---|
| 18 | 1234 | 2314 |
| 19 | 1235 | 0017 |
| 20 | 1235 | 1897 |
| 21 | 1235 | 0112 |
| 21 | 1235 | 3211 |
| 22 | 1236 | 1654 |

The mapping 142 is used to convert between data in XML constructs, like XML document 110, and data in one or more XML type object-relational constructs, like table 144 or table 145.

In addition to, or instead of, mappings 142 and XML type object-relational construct 144; the database server 130 may also store on database storage space 140 a legacy database 150. In the legacy database, the tables are not directly related to an XML construct through a mapping 142. For example the data may have been stored and used in multiple applications before DEPT type XML documents were defined in schema 102. In the illustrated embodiment, the legacy database 150 includes a DPT table and an EMP table. The DPT table includes columns with column names DPTNO, DPTNA, DPTLO, and DPTMGR to store data that represents department number, department name, department location and department manager, respectively. One or more of these columns may be object types of an object-relational database; for example, column DPTLO may include objects of ADDRESS type. The EMP table includes columns with column names EMPNO, EMPNA, DPTNO and EADD, among others, to store data that represents employee number, employee name, employee department, employee address, among others, respectively.

Sample rows in tables 152, 154 are listed in Table 4, and Table 5, respectively. For purposes of illustration, values are given for several departments that might be converted to several XML documents of type DEPT.

TABLE 4

Portion of DPT table

| row | DPTNO | DPTNA | DPTLO | DPTMGR |
|---|---|---|---|---|
| 1 | 100 | Corporate | 1000 Main St, Centerville, MO, 11111-2222, USA | 0002 |
| 2 | 101 | Human Resources, Corp. | 1000 Main St, Centerville, MO, 11111-2222, USA | 0017 |
| 3 | 105 | SALES | 52 Fifth Ave., New York, NY, 10000-9999, USA | 0054 |

TABLE 5

Portion of EMP table

| row | EMPNO | EMPNA | DPTNO | EADD | . . . |
|---|---|---|---|---|---|
| 1 | 0002 | Alice Founder | 100 | 578 Pine Avenue, Centerville, MO 11111-2222, USA | |
| 2 | 0008 | Fred Altrue | 100 | 279 Maple Road, Outerville, MO 11115, USA | |
| 3 | 0017 | John Gladstone | 101 | 8 Lovely Lane, Lowerville, Mo 11112-4321, USA | |
| . . . | | | | | |
| 21 | 0112 | Sanjay Mural | 101 | . . . | |
| . . . | | | | | |
| 434 | 1654 | Jose Gonzales | 105 | . . . | |

XML queries have no meaning for object-relational contracts such as tables and columns that are not XML type. An XML type object is generated for the XML queries. An XML type object may be generated in an XML database server from non-XML type constructs using one or more XML generation functions. A sub-query including XML generation functions is then included in XML queries directed to data in object-relational constructs that are not XML type. In some cases a sub-query including XML generation functions may be stored as an XML type view, such as XML type view 148.

Functional Overview

Under some conditions, when the SQL/XML query is being compiled, the SQL/XML DBMS can determine one or more columns of one or more tables where the queried data reside, which columns represent less than the whole XML construct in the tables. When this occurs, the SQL/XML query is rewritten as an SQL query on the one or more columns of the underlying tables where the queried XML data are stored. For example, XPath queries over schema-based and non-schema-based XML type views are rewritten to go directly over the underlying object-relational data. The entire XML construct does not need to be manifested, and, in many cases, the query is rewritten to go directly on relational data. The rewritten query allows efficient access of the relational data, and can lead to orders of magnitude performance gains over previous approaches. Relational indexes can be created and optimized and used for highly efficient query execution. Furthermore, existing relational indexes already created can be used for a new domain of applications, namely, those that use XPath retrieval. In addition, knowledge about the metadata of the underlying data can lead to more efficient access paths, as well as more optimal query execution algorithms Murthy-1. reveals a mechanism to rewrite a query with an XPath operator, directed to an XML type table, as an SQL query. When the re-written query is executed, some information of interest comes directly from the tables without generating an XML representation and without subsequent parsing by the XPath operation. In some cases, no XML operation need be invoked at all.

In other embodiments disclosed herein, techniques are employed that rewrite a query that includes a sub-query with XML generation operations, either explicitly, or implicitly as a view of XML type.

Figure 2:
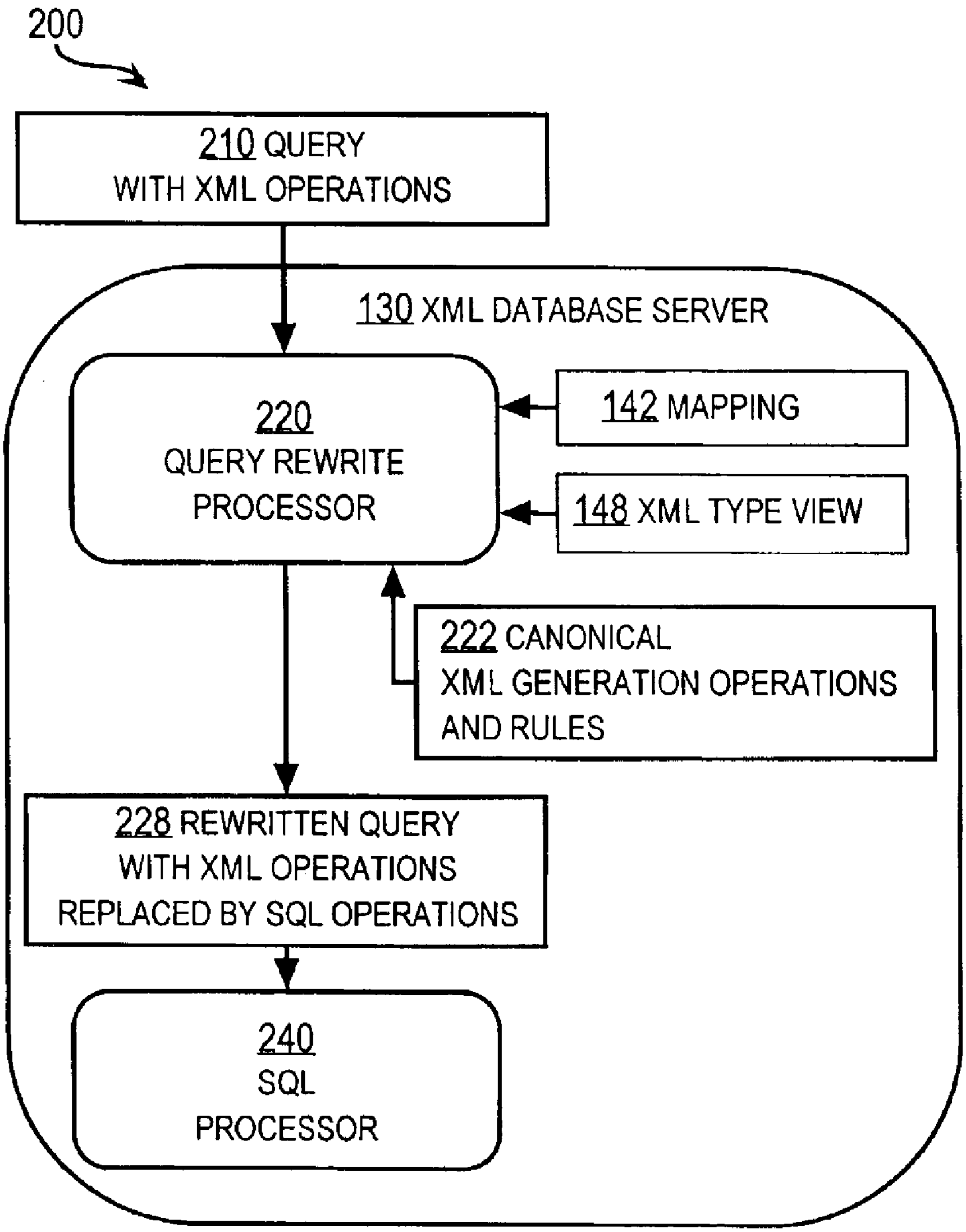
FIG. 2 is a block diagram that illustrates a database server that rewrites a database query to replace an XML operation with a SQL operation, according to an embodiment.

FIG. 2 is a block diagram that illustrates a database server 130 that rewrites a database query 210 to replace an XML operation with an SQL operation, according to an embodiment. Query 210 is a database command that requests some database contents. The query 210 includes an XML component operation to operate on a component of a particular XML construct, such as an SQL/XML function to operate on a component identified by an XPath expression.

XML database server 130 includes a query rewrite processor 220 that determines at compile time whether the query 210 can be rewritten to eliminate one or more XML operations, and, if so, rewrites the query without those XML operations that can be eliminated. Query rewrite processor 220 uses information in the mapping 142 or the definition of a stored sub-query in XML type view 148, or both, to determine whether and how to rewrite the query 210. In some embodiments, one or more data structures 222 hold data indicating a set of canonical XML generation operations and rules for substituting the canonical XML generation operations for any non-canonical XML generation operations. In some embodiments, the data structures 222 hold data indicating rules for eliminating or replacing XPath operations on canonical XML generation operations. When the query 210 involves one or more XML generation operations in a sub-query of query 210 or in XML type view 148, the data structures 222 are also used by the query rewrite processor 220.

When the query can be rewritten, the output of the query rewrite processor 220 is a rewritten query 228 with one or more XML operations replaced by SQL operations. The SQL portions of the rewritten query 228 are input to an SQL processor 240 to optimize, store and eventually execute the SQL portions of the rewritten query 228. Portions of the query that are not rewritten are input to an XML processor (not shown) to generate and parse XML constructs.

XPath Queries

XPath expressions are used to specify a location in an XML construct, e.g., a "node" of the DOM tree for the XML construct, in a series of steps from a root level of the DOM indicated by a leading slash "/". A step to a child element from a parent element is indicated by a slash "/," and an attribute of an element is indicated by a ampersand "@". Each direction of traversal from an element is called an axis of traversal. In addition to child and attribute axes, there are axes that represent traversals to a parent, all descendents, all ancestors, all siblings, all preceding elements, all following elements, only elements of a particular type, as well as other axes. XPath also allows conditions predicate ("predicates") that are to be satisfied by the indicated locations. An XPath predicate is enveloped by square brackets "[","]". For example, in the XML document 110, one of the ENO elements 114 in ELIST 112*d*, which has the value 1234 can be indicated by the XPath expression:

/DEPT/ELIST/ENO[ENO=1234].

SQL/XML Functions

SQL/XML functions allow XPath expressions as operands. In particular, three SQL/XML functions are widely used to operate on XML types that represent XML constructs or portions thereof: EXISTSNODE, EXTRACT, and EXTACTVALUE. EXISTSNODE operating on an XPath expression returns a value "1" if the location indicated by the XPath expression actually occurs in the XML construct, and a "0" otherwise. EXTRACT operating on an XPath expression returns a data stream representing XML elements of the indicated location and all their descendents. EXTRACTVALUE operating on an XPath expression returns a scalar value, if any, associated with the element at the indicated location, excluding any XML tags.

Example XML Generation Sub-Query

Object-relational types that are not XML types can be used to generate XML data streams using one or more XML generation functions in a sub-query (such as in a view definition). For example, an XML type view can be defined that outputs an XML data stream from columns that are not XML types. XML type views can be implemented in an Oracle XML Database DBMS using different techniques. Legacy and non-legacy data can be mapped to XML using XML type views. The object types serve as metadata for the XML produced by capturing all the element and attribute names, as well as their nesting and hierarchical information. In general, this technique can be used to produce XML of desired structure by creating object types of appropriate structure, without the need for data migration.

According to one technique, data stored in columns of a relational table are directly made available to XML applications by creating object views over the relational data, and then creating XML type views over the object views. The mapping of the relational data to XML is determined by the object types used. A variant of this technique is to create XML type views directly over the relational data, but using object types to first build an object-relational data set. Table 6 lists example SQL/XML commands to generate an XML type view.

TABLE 6

Example XML type view

| line number | SQL/XML statements |
|---|---|
| 1 | CREATE OR REPLACE TYPE EMP__T AS OBJECT ( |
| 2 | "@EMPLOYEEID" NUMBER, NAME VARCHAR2(30), |
| 3 | JOB VARCHAR2(30), |

TABLE 6-continued

Example XML type view

| line number | SQL/XML statements |
|---|---|
| 4 | MANAGER VARCHAR2(30)); |
| 5 | CREATE VIEW EMPLOYEE__XML OF XMLTYPE |
| 6 | WITH OBJECT ID |
| 7 | (EXTRACT(SYS__NC__ROWINFO$, |
| 8 | /ROW/@EMPLOYEEID').GETNUMBERVAL( )) |
| 9 | AS SELECT |
| 10 | SYS__XMLGEN (EMP__T(EMPNO, ENAME, JOB, MGR)) |
| 11 | FROM EMP; |

In Table 6, the object type is defined in lines 1 through 4, and the XML type view is defined based on that object in lines 5 through 11. Here the XML generation operation is represented by the SQL/XML function SYS__XMLGEN in line 10, which takes an object type EMP__T as input and outputs a data stream representing XML type for certain columns of that object type. Lines 6 though 8 obtain a particular object identification (OBJECT ID) for the generated XML type. In this example, it is assumed that the EMP table 154 includes a JOB column.

An XML data stream that such a view might generate from a row of data is given in Table 7.

TABLE 7

Example output from XML type view in Table 6.

| line number | XML statements |
|---|---|
| 1 | <?xml version="1.0"?> |
| 2 | <ROW EMPLOYEEID="7369"> |
| 3 | <NAME>SMITH</NAME> |
| 4 | <JOB>CLERK</JOB> |
| 5 | <MANAGER>7902</MANAGER> |
| 6 | </ROW> |

According to a second technique, SQL/XML functions are used as part of XML type views to construct relational data in appropriate format. Note that object types can also be potentially used, but the primary mode of controlling the mapping is in the hierarchy of the XML generation functions itself. A combination of both above techniques may also be used to generate XML type views. Several columns can be defined as objects and a combination of these objects or other columns can be converted to XML type.

Table 8 lists example SQL/XML commands to generate an XML type view according to the second technique.

TABLE 8

Example XML type view

| line number | SQL/XML statements |
|---|---|
| 1 | CREATE VIEW EMPLOYEE__SQL__XML OF XMLTYPE |
| 2 | WITH OBJECT ID |
| 3 | (EXTRACT(SYS__NC__ROWINFO$, |
| 4 | '/ROW/@EMPLOYEEID').getnumberval( )) |
| 5 | AS SELECT |
| 6 | XMLELEMENT( |
| 7 | "ROW", |
| 8 | XMLATTRIBUTES(EMPNO AS EMPLOYEEID), |
| 9 | XMLFOREST( |

TABLE 8-continued

Example XML type view

| line number | SQL/XML statements |
|---|---|
| 10 | ENAME AS NAME, |
| 11 | JOB AS JOB, |
| 12 | MGR AS MANAGER |
| 13 | ) |
| 14 | ) |
| 15 | FROM EMP; |

In Table 8, the XML generation operation is represented by the SQL/XML function XMLELEMENT in lines 6 through 14, and the nested SQL/XML functions XMLATTRIBUTES in line 8, and XMLFOREST in lines 9 through 13. These functions generate a XML element "ROW" that includes an attribute EMPLOYEEID and several other elements named NAME, JOB, and MANAGER. XMLATTRIBUTES and XMLFOREST take object-relational columns as operand inputs and output a data stream representing XML. Lines 2 through 4 obtain a particular object identification (OBJECT ID) for the XML type.

An XML data stream that such a view might generate from a row of data is given in Table 9.

TABLE 9

Example output from XML type view in Table 8.

| line number | XML statements |
|---|---|
| 1 | <ROW EMPLOYEEID="7369"> |
| 2 | <NAME>SMITH</NAME> |
| 3 | <JOB>CLERK</JOB> |
| 4 | <MANAGER>7902</MANAGER> |
| 5 | </ROW> |

According to a third technique, an XMLSchema document is used to control the snapping of the relational and object-relational data to XML. The resultant XML is schema-based, so there is an associated XMLSchema document to which the resultant XML conforms. Annotations in the XMLSchema provide a flexible means of controlling the mapping of the relational or object-relational data into XML constructs. XMLSchema can be used for renaming the elements in the resultant XML, for capturing constraints such as enumeration, and other aspects of XML generation and validation.

Table 10 lists example SQL/XML commands to generate an XML type view according to the third technique.

TABLE 10

Example XML type view

| line number | SQL/XML statements |
|---|---|
| 1 | CREATE OR REPLACE VIEW EMP_VIEW OF XMLTYPE |
| 2 | XMLSCHEMA "http://www.ABCcorp.com/ tkxmsch16.xsd" |
| 3 | ELEMENT "Employee" |
| 4 | WITH OBJECT ID ((EXTRACT(SYS_NC_ROWINFO$, |
| 5 | '/ROW/@EMPLOYEEID').getnumberval( )) |
| 6 | AS SELECT |
| 7 | EMP_T(EMPNO, ENAME, JOB, MGR) |
| 8 | FROM EMPL |

In Table 10, an XML generation operation is not used explicitly to generate the view. Instead, as indicated in line 2, the schema tkxmsch16.xsd is used as mapping 142 to define the XML element Employee and its component elements and attributes. The indicated columns in the table EMP are mapped to corresponding elements and attributes of different names in the XML type output data stream. For purposes of illustration, it is assumed that the mapping 142 renames EMPNO as attribute ID and renames ENAME, JOB, MGR as elements EMPLOYEENAME, OCCUPATION, MANAGER, respectively. Lines 4 though 5 obtain a particular object identification (OBJECT ID) for the XML type. The object EMP_T used in line 7 of Table 10 is defined above with reference to Table 6.

An XML data stream that such a view might generate from a row of data in the EMP table is given in Table 11.

TABLE 11

Example output from XML type view in Table 10.

| line number | XML statements |
|---|---|
| 1 | <?xml version="1.0"?> |
| 2 | <Employee ID="7369"> |
| 3 | <EMPLOYEENAME>SMITH</EMPLOYEENAME> |
| 4 | <OCCUPATION>CLERK</OCCUPATION> |
| 5 | <MANAGER>7902</MANAGER> |
| 6 | </Employee> |

Canonical XML Generation Operations

SQL/XML includes several XML generation functions, including XMLFOREST, XMLCOLATTVAL, XMLCONCAT, SYS_XMLGEN, SYS_XMLAGG, and XMLFORMAT, among others, to form XML type output conveniently in different circumstances. The SQL/XML generation functions are well known in the art and some are described in more detail in examples given below. Some of these are illustrated in the previous section where they are used to generate XML type output from data in object-relational constructs. Some XML functions are DBMS specific extensions to the SQL/XML standards, such as XMLSEQUENCE, described in Murthy 2 and further in a following section.

According to some embodiments, all XML generation functions can be replaced by a smaller set of primitive XML generation operations. In one embodiment, an illustrated set of primitive XML generation functions constitute a set of so called "canonical XML generation functions," or simply "canonical functions." The canonical functions are indicated hereinafter as XEL, XAT, XCDAT, XPI, XCOM, XAG. In other embodiments, the functionality of a primitive set of XML generation functions, or their names, or both, may be different from these canonical functions.

The canonical function XEL outputs a data stream of XML type based on a first input operand that indicates the XML tag for the element, and a series of one or more additional operands that specify child elements or attributes of the element. A null in the first position indicates a surrounding tag is not generated, and a series of operands would be interpreted as sibling nodes in an XML hierarchy. Each operand following the first is an SQL or XML generation expression that evaluates to a value for the corresponding element, with an optional name (called an "alias") for the element following the keyword "AS" after the expression. The alias may be an expression that generates the alias name. If an alias is missing, the element will have an automatically generated name. The function XEL may be nested as an operand of another call to function XEL.

The canonical function XAT outputs a data stream that indicates an XML attribute of a particular element based on an operand that is a name expression that evaluates to a value for the attribute name, with "name" following the keyword "AS" after the name expression. The function XAT may be nested as an operand of the canonical function XEL to form an attribute for that element.

The canonical functions XCDAT, XPI, XCOM output data streams that indicate character data, a processing instruction, or a comment, respectively. These functions may be nested in the canonical function XEL to add such data to an element.

The canonical function XAG is an aggregate function that takes as input a group of XML type expression. XAG aggregates the values of XML type in each group by concatenating them all together, and outputs a single value of XML type per group as result.

In the illustrated embodiment, rules are established for replacing XML generation operations with one or more nested or non-nested calls to the canonical functions. For example, Table 12 lists how some XML generation operations are replaced by one or more canonical functions.

The use of primitive operations, such as the canonical functions, simplifies the determination of whether and how to rewrite an XML query that involves an XML generation operation in a sub-query, as is described in further detail in a later section.

Method for Processing XML Queries

Figure 3:
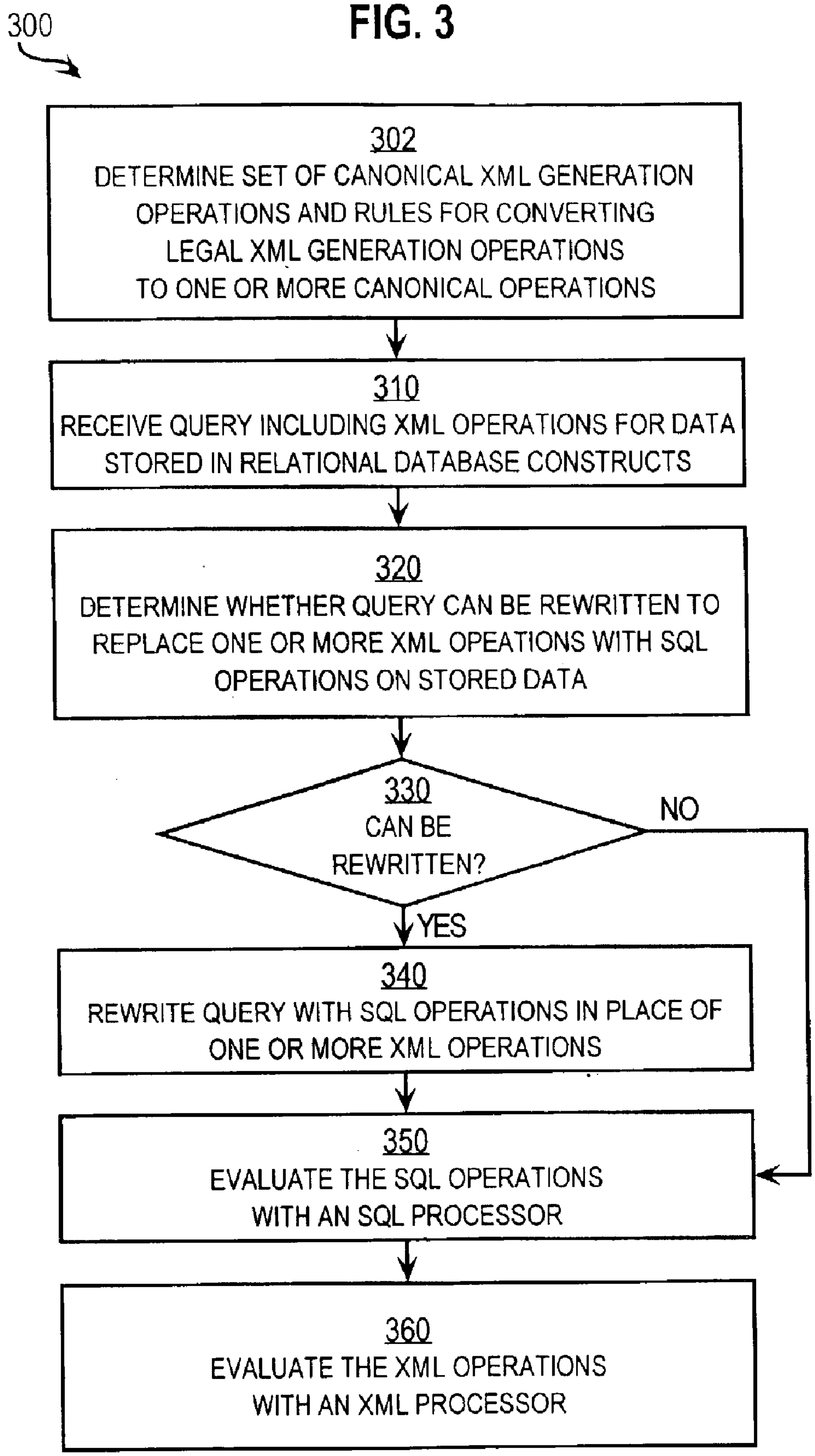
FIG. 3 is a flow diagram that illustrates a method for rewriting a database query that has an XML operation, according to an embodiment.

FIG. 3 is a flow diagram that illustrates a method 300 for rewriting a database query that has an XML operation, according to an embodiment. Although steps are shown in FIG. 3 and subsequent flow diagrams in a particular order, in other embodiments one or more steps may be performed in a different order or overlapping in time. In the illustrated embodiment, the steps of method 300 are performed at compile time before SQL optimization steps, so that the resulting rewritten query, if any, can be optimized by the SQL processor.

In Step 302, a set of canonical XML generation operations and rules for converting legal XML generation operations to one or more of the canonical operations are determined. For example, the canonical functions XEL, XAT, XCDAT, XPI, XCOM, XAG are defined and the canonicalization rules of Table 12 are established. In other embodiments, other primitive operations may be defined and used with different rules for converting legal XML operations.

TABLE 12

Sample Rules for converting XML Generation Operations to Canonical Functions

| Case | XML Generation Operation | Canonicalization Rule |
|---|---|---|
| 1 | XMLFOREST(expr1, expr2 as<br>alias2, . . . , expr n as "alias n") | XEL(null, expr1 as "<expr1_name>",<br>expr2 as alias2 . . . , expr n as "alias n") |
| 2 | XMLCOLATTVAL(<br>expr1,<br>expr2 as alias2, . . . ,<br>expr n as "alias n") | XEL(null,<br>XEL("column", XAT('<expr1_name>' as name),<br>expr1),<br>XEL("column", XAT('alias2' as name), expr2),<br>. . . ,<br>XEL("column", XAT('alias n' as name), expr n)<br>) |
| 3 | XMLCONCAT(xmlexpr1, . . . ,<br>xmlexpr n) | XEL(null, xmlexpr1, . . . , xmlexpr n) |
| 4 | SYS_XMLGEN(expr1<br>[,XMLFORMAT('alias1')]<br>) | XEL("alias1", expr1)<br>[the identifier "ROW" is used for "alias1" in case an alias is not specified using XMLFORMAT] |
| 5 | SYS_XMLAGG(expr1<br>[, XMLFORMAT('alias1')]<br>) | XEL("alias1", XAG(expr1))<br>[the identifier "ROWSET" is used for "alias1" in case an alias is not specified using XMLFORMAT] |
| 6 | (SELECT XMLAGG(expr1<br>ORDER BY expr3)<br>FROM t1<br>WHERE expr2)) | XEL(CAST(MULTISET(<br>SELECT XEL(expr1)<br>FROM t1 WHERE expr2 ORDER BY expr3)<br>AS XMLSEQUENCETYPE)) |
| 7 | (XMLSEQUENCE(<br>SELECT XMLAGG(<br>XEL('alias', expr1, . . . , expr n))<br>FROM t1 WHERE <cond><br>GROUP BY <gby expr><br>ORDER BY <oby expr>)) | CAST(MULTISET(<br>SELECT XEL('alias', expr 1, . . . , expr n)<br>FROM t1 WHERE <cond><br>GROUP BY <gby expr><br>ORDER BY <oby expr>)<br>AS XMLSEQUENCETYPE) |

In Table 12, the nested CAST(MULTISET( )) SQL functions convert a row source to an instance of XMLSequence type. XMLSequence type is a variable array of XML type instances. The CAST(MUTLISET( )) function populates the elements of the variable array such that the XML type data from each row of the row source goes into one element of the variable array. The XMLSEQUENCE function takes as input an XML type instance, and returns an instance of XMLSequence type. The XMLSEQUENCE function populates the elements of the variable array such that each top-level element in the input XML type instance goes into one element of the variable array.

In step 310, a query is received from a database client. The query includes one or more XML operations for data stored in relational or object-relational database constructs.

In step 320, it is determined whether the query can be rewritten to replace one or more XML operations with one or more SQL operations on the data stored in the relational or object-relational constructs. In some embodiments, determining whether the query can be rewritten includes determining how to rewrite the query. Step 320 is described in more detail in a later section with reference to FIG. 4.

Step 330 represents a branch point in the flow. If it is determined in step 320 that the query can be rewritten to remove one or more XML operations, then control passes to step 340 to rewrite the query. Otherwise, the query is not rewritten and control passes to step 350 to begin processing the original query.

In step 340, the query is rewritten to eliminate one or more XML operations. In some embodiments, in which it is determined how to rewrite the query during step 320, step 320 overlaps steps 330 and 340 in time.

In step 350, the SQL operations are evaluated with an SQL processor according to any method known in the art. For example, in some embodiments, step 350 includes optimizing the SQL statements using any indexes available to efficiently execute the query, storing the optimized query for repeated use, and executing the optimized query for the current values in the database. In embodiments in which the original query includes only XML operations and the query cannot be rewritten, step 350 may be omitted.

In step 360, the XML operations are evaluated with an SQL/XML processor according to any method known in the art. For example, in some embodiments, step 360 includes generating a data stream of XML elements and parsing the data stream to operate on portions of the XML data stream. In embodiments in which the rewritten query includes no XML operations, step 360 may be omitted.

In some other embodiments, step 360 is performed before step 350. In some embodiments steps 350 and 360 overlap in time.

The process repeats at step 310 when another query with XML operations is received by the XML Database DBMS server.

Method for Determining whether to Rewrite XML Queries

Figure 4:
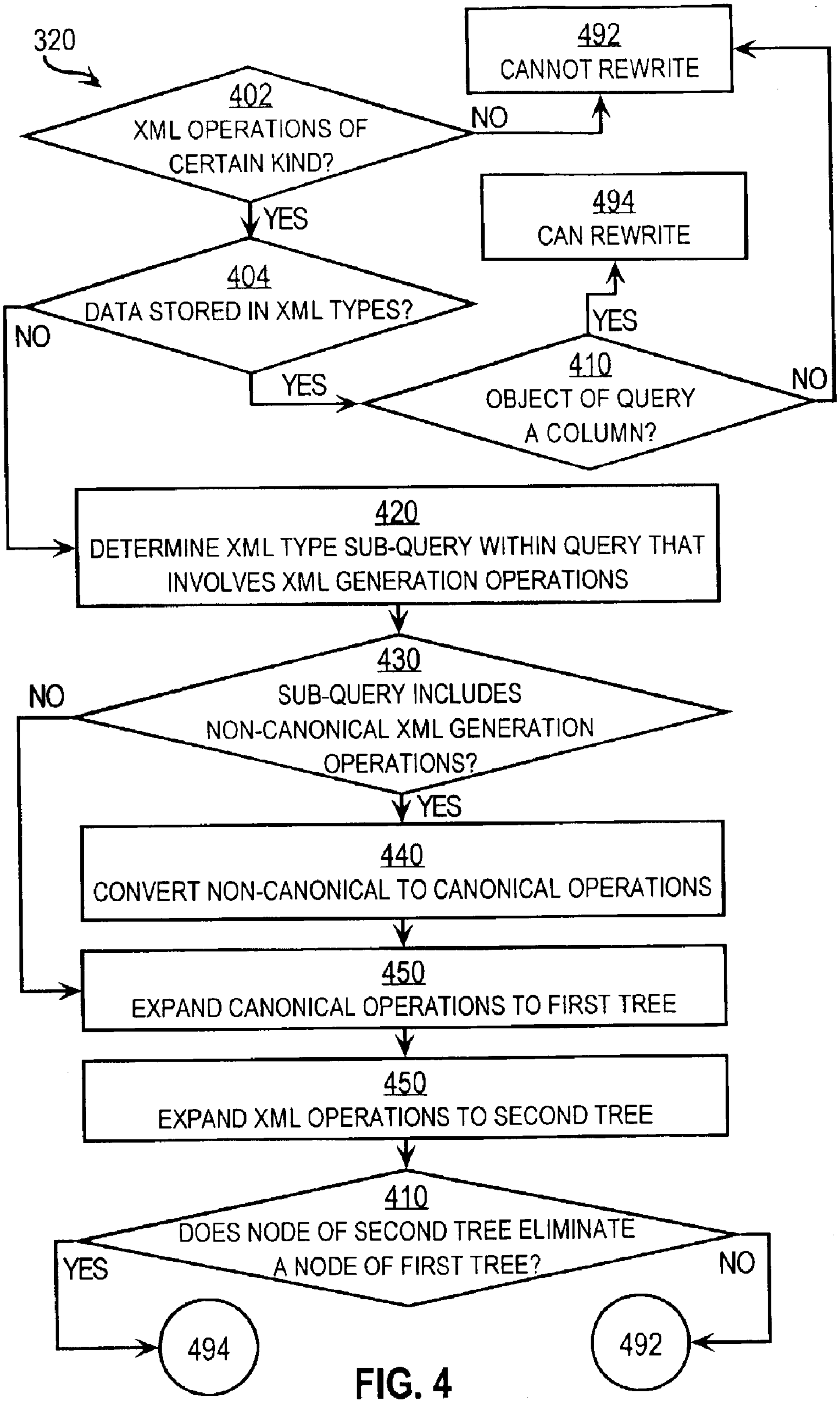
FIG. 4 is a flow diagram that illustrates an embodiment of a step in the method of FIG. 3.

FIG. 4 is a flow diagram that illustrates an embodiment of step 320 in the method 300 of FIG. 3.

Gateway Conditions

In step 402 the query is examined to determine whether an embedded XML operation belongs to a certain kind that are to be rewritten. These gateway conditions under which the query is to be rewritten depend on the embodiment. In an illustrated embodiment, described in the following paragraphs, the conditions depend on the kind of XPath expression and the SQL/XML functions that operate on those XPath expressions. In the following, object types are also called abstract data types (ADTs).

XPath based SQL/XML operators (EXTRACT, EXISTNODE, EXTRACTVALUE) operating on schema-based XML type columns are rewritten to go against the underlying SQL columns. This enables further SQL optimizations that fully exploit the object-relational storage of the XML constructs. The following kinds of XPath expressions can be translated into the underlying SQL queries using simple rules.

1. Simple XPath expressions—involve simple traversals, wherein the XPath expression consists only of a series of child axis traversals.

2. Collection traversal expressions—involve traversal wherein one or more of the nodes in the XPath expression maps to a collection in the object-relational mapping.

3. Expressions involving wildcard axes (*) axes—Transform those expressions involving the wildcard axes provided the datatypes of the resulting nodes are all coercible. (e.g. CUST/*/CUSTNAME must point to CUSTNAMEs which are all of the same or coercible datatypes).

4. Expressions involving descendant axis (//)—Transform these expressions provided the datatypes of the resulting nodes are the same or coercible.

5. All of these expressions must work with the type cache, which includes "hidden" traversals like REFs to XML types etc. (for instance xdb$schema_t stores a varray of REFs to xdb$element_t and this is not directly apparent in the XPath expression or the resulting XML construct).

Transformations of these XPath expressions are supported in the EXISTSNODE, EXTRACTVALUE and EXTRACT usage scenarios. EXTRACT, EXTRACTVALUE and EXISTSNODE can appear in the following positions In the select list, from clause, where clause predicate, and in "having," group by and order by expressions in a SQL query.

In the Index clause of a CREATE INDEX statement., e.g.: CREATE INDEX foo_index ON foo_tab (EXTRACTVALUE(xml_col, '/PO/PONO'));

In all these cases, the EXISTSNODE and EXTRACT operator get replaced by their defining underlying expressions, as described in more detail below.

If the gateway conditions for rewriting that are tested in step 402 are not satisfied, then control passes to step 492, bypassing further efforts to rewrite the query. If the gateway conditions are satisfied, control passes to step 404.

In step 404 it is determined whether the data are stored in XML types, such as are defined in an XML schema for relational constructs, like mapping 142. If so, then control passes to step 410. If not, then control passes to step 420. For example, if the data are stored in tables 144 and 145 of XML type, then control passes to step 410. If the data are stored in tables 152, 154, then control passes to step 420. In some embodiments, both schema-based and non schema-based XML conversions are rewritten using the same rules; in such embodiments, step 404 may be omitted.

In step 410, further conditions on rewriting queries with XML operations are tested, if any. In some embodiments, these conditions include that the target of the query be a column in one of the object-relational constructs. If these conditions are satisfied, then control passes to step 494, indicating that the query can be rewritten. If not, control passes to step 492, to bypass rewriting. For example, if the target of the XPath is an element of a parent that is stored as a LOB, the XML operation can not be entirely replaced by an SQL operation that produces the same result. In some embodiments, the conditions of step 410 are included in the gateway conditions tested in step 402, and step 410 may be omitted. In some embodiments, the gateway conditions of step 402 are included in step 410, and step 402 can be omitted.

Rewrite of XML Operations on Data Stored as XML Types

When control passes to step 494, the query rewrite step 340 performs the following steps.

Simple XPath traversals are rewritten into object type accessors. Predicates are handled by putting them in the where clause. Any XPath child access over an object type is translated to an object attribute access on the underlying object type. For example A/B maps to a.b where A maps to the object type a and the XPath node B maps to the attribute of "a" named "b". This rewrite is consistent at any level of the XPath expression, e.g. whether the XPath traversal occurs within a predicate, or a location path variable.

Some example rewrites for XML types are described next.

PO/CUSTOMER/CUSTOMERNAME becomes

"po". "cust". "custname"

(assuming PO maps to "po" etc.).

Predicates are handled by rewriting the predicate expression in the underlying object expressions.

In the simple case, for EXISTSNODE, the main location path traversal becomes a IS NOT NULL predicate, whereas for the EXTRACT case, this becomes the actual node being extracted.

EXISTSNODE(po_col, 'PO/CUSTOMER/CUSTOMERNAME')

becomes

CASE (WHEN ("po"."cust"."custname" IS NOT NULL) then 1 else 0)

Predicates are handled in a similar manner. For example, in the operator given below, EXISTSNODE(po_col, PO/CUSTOMER[CUSTOMERNO=20]/CUSTOMERNAME')

the predicate, D=20 is treated as if the user specified, (A/B/D=20). Thus the whole expression becomes, CASE (WHEN ("po"."cust"."custname" IS NOT NULL AND ("po"."cust"."custno"=20)) then 1 else 0)

The XPath expressions may also span collection constructs and the queries are still rewritten by using subqueries on the collection tables. For example, EXISTSNODE(po_col, '/PO/lineitems[lineitemno=20]') is checking for the existence of line items in a purchase order where the line item number is 20. This becomes, CASE(when (EXISTS(select * from TABLE ("po"."lineitems") WHERE lineitemno=20)) then 1 else 0)

Further examples of rewriting queries involving XML type object-relational constructs follow.

Original Query select * from MyPOs p where EXISTSNODE(p, '/PO[PNAME="PO1"] PONO')=1

After Rewrite of EXISTSNODE select * from MyPOs p where (CASE WHEN (p.xmldata.pono IS NOT NULL) AND (p.xmldata.PNAME='PO1')) THEN 1 ELSE 0)=1

Original Statement select EXTRACTVALUE(p, '/[PNAME="PO1"]/PONO') from MyPOs p

After Rewrite of EXTRACTVALUE select (select p.xmldata.pono from dual where p.xmldata.pname='PO1')

from MyPOs

XML Operations on Data Not Stored as XML Types

If it is determined in step 404 that data are not stored as XML types, then XML generation operations are involved in a sub-query to generate the XML data stream on which the XPath and SQL/XML operations operate. Control passes to step 420 to determine the sub-query with XML generation operations.

For purposes of illustration, it is assumed that the sub-query is stored as an XML type view 148 named "dept_xv" on the non-XML tables 152, 154, named DPT and EMP, respectively, as shown in FIG. 1. The view dept_xv is defined by the SQL/XML statements in Table 13, including one or more XML generation operations. Further examples are provided in the Appendix.

TABLE 13

XML type view dept_xv

| line number | SQL/XML statements |
|---|---|
| 1 | CREATE OR REPLACE VIEW dept_xv OF XMLTYPE AS |
| 2 | SELECT SYS_XMLAGG( |
| 3 | SYS_XMLGEN (d.DPTNO, XMLFORMAT("DNO")), |
| 4 | SYS_XMLGEN (d.DPTNA, XMLFORMAT("DNAME")), |
| 5 | SYS_XMLGEN (d.DPTLO, XMLFORMAT("DLOC")), |
| 6 | SYS_XMLAGG( |
| 7 | (SELECT (SYS_XMLGEN(e.EMPNO), XMLFORMAT ("ENO")) |
| 8 | FROM EMP e |
| 9 | WHERE e.DPTNO = d.DPTNO)) |
| 10 | ORDER BY d.DPTNO, |
| 11 | XMLFORMAT ("DEPT") |
| 12 | ) |
| 13 | FROM DPT d |

The sub-query stored as view dept_xv contains the XML generation operations SYS_XMLGEN and SYS_XMLAGG.

In step 430, it is determined whether the sub-query includes non-canonical XML generation operations. If so, then control passes to step 440 to convert to canonical functions. If not, then step 440 is skipped and control passes to step 450. In the illustrated embodiment, the view dept_xv includes the non-canonical XML generation operations SYS_XMLGEN and XMLAGG, so control passes to step 440. In other embodiments, step 430 involves determining whether the sub-query includes non-primitive operations.

In step 440, the non-canonical XML generation operations are converted to canonical XML generation operations using the rules in Table 12. In other embodiments, step 440 involves converting to other primitive XML generation operations. In the illustrated embodiment, the XML generation operations in Table 13 for dept_xv are converted to the canonical functions as shown in Table 14.

TABLE 14

Sub-query of XML type view dept_xv after canonicalization

| line number | SQL/XML statements with canonicalized XML generation functions |
|---|---|
| 1 | SELECT XEL( |
| 2 | "DEPT", |
| 3 | XEL ("DNO", d.DPTNO), |
| 4 | XEL ("DNAME", d.DPTNA), |
| 5 | XEL ("DLOC", d.DPTLO), |
| 6 | XEL ("ELIST", |
| 7 | SELECT XAG(XEL("ENO", e.EMPNO) |
| 8 | ORDER BY d.DPTNO) |
| 9 | FROM EMP e |
| 10 | WhERE e.DPTNO = d.DPTNO |
| 11 | ) |
| 12 | ) |
| 13 | FROM DPT d |

Tree of Canonical XML Generation Functions

In step 450, canonical XML generation functions are expanded to a normalized tree of canonical functions. In other embodiments, the primitive XML generation operations are expanded to a normalized tree of primitive operations. In a normalized tree, each XEL function has a single non-XML type operand, such as a single scalar operand, or a single abstract data type (ADT) operand, or a single collection type column (typically at a leaf node of the normalized tree), or a set of operands that are of XML type (typically at a parent node of the normalized tree). In some embodiments, a set of operands of XML type might be the result of a tree of canonical XML generation functions. It is ensured that each child in the normalized tree is explicitly tagged. If the child is an ADT that is not tagged, the XEL function is converted to the form XEL (null, "<value expression>" as "<type name>"). Scalar operands are always tagged.

Figure 5:
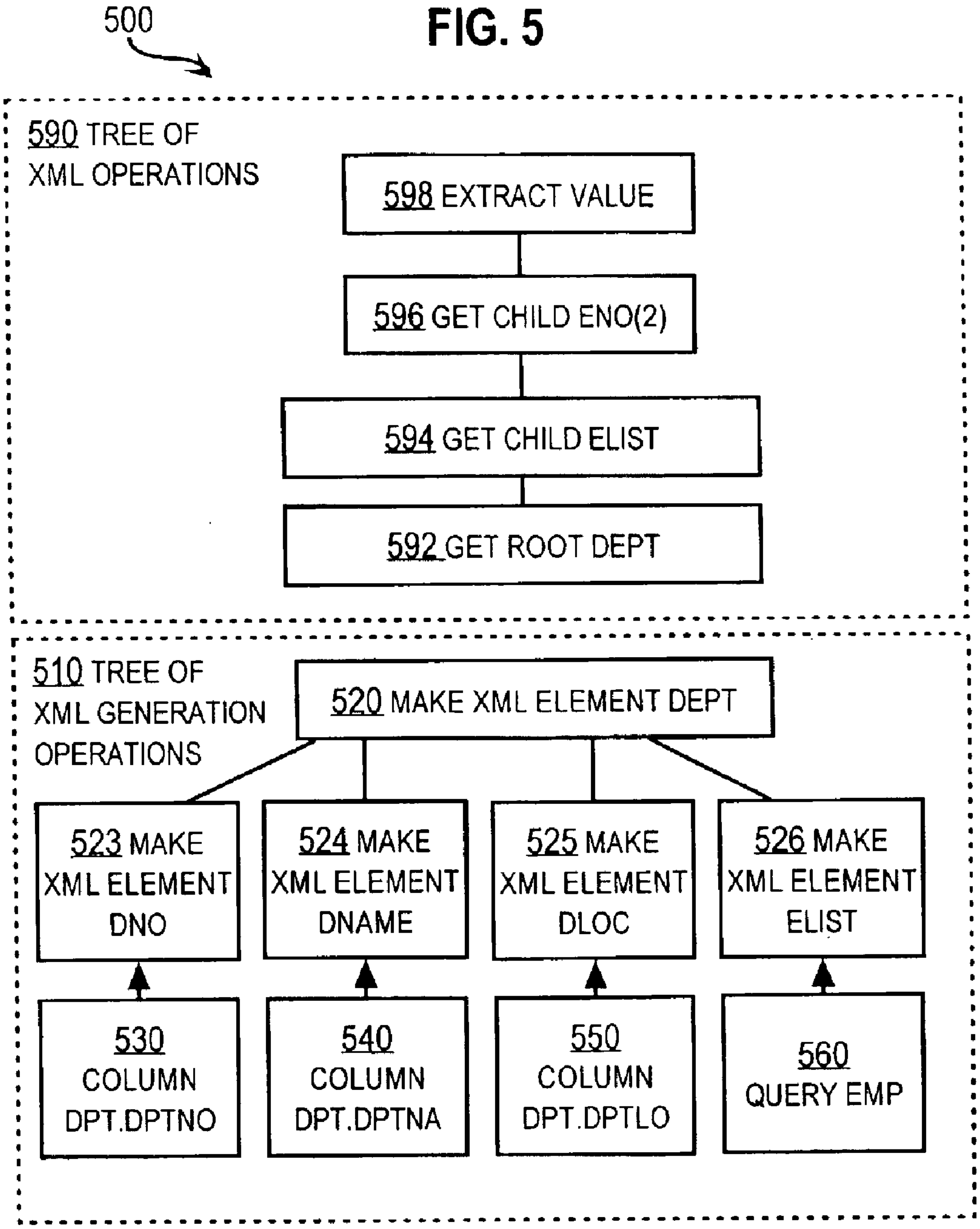
FIG. 5 is a block diagram that illustrates interoperation between a tree of XPath operations and a tree of XML generation operations, according to an embodiment.

For example, FIG. 5 is a block diagram that illustrates a normalized tree 510 of XML generation operations in the sub-query for view dept_xv. In tree 510, each XEL function has a single non-XML type operand, or a set of XML type operands.

For example, node 523 corresponds to the XEL function call that generates XML element DNO, as indicated in line 3 of Table 14. The operand of this XEL function is a single scalar, the department number value in column DPTNO from a row in table DPT as indicated in tree 510 by node 530. Similarly, nodes 524, 525 corresponds to the XEL function calls that generate elements DNAME, DLOC, respectively, as indicated in lines 4 and 5 of Table 14. The operands of these XEL function are each a single scalar or object, the department name value in column DPTNA from a row in table DPT as indicated by node 540, or the department location object value in column DPTLO from a row in table DPT as indicated by node 550.

Node 560 corresponds to an SQL query (a sub-query of view dept_xv) that produces multiple XML elements ENO, as indicated in lines 7 through 9 of Table 14. Node 526 corresponds to the XEL function call that generates XML element ELIST, as indicated in line 6 of Table 14. The operand of this XEL function is a set of XML elements ENO formed by the sub-query at node 560.

Node 520 corresponds to the XEL function call that generates the root XML element DEPT, as indicated in lines 1 and 2 of Table 14. The operand of this XEL function is a set of XML elements output by nested XEL function calls that generate elements DNO, DNAME, DLOC and ELIST as indicated in tree 510 by nodes 523, 524, 525, 526.

Tree of XML Component Operations on the Sub-Query

In step 460, XML component operations that operate on the results of the XML generating sub-query are expanded to a second tree of XML component operations. For example, an XPath expression consists of a series of steps, applied in order. The result of one step can be viewed as the input to the next. This leads to the mapping of an XPath expression to a tree of XPath operators. The XPath expression is broken into its component steps. Each step is represented as a subtree using the fundamental XPath operators, plus other operators that cannot be further simplified. The root of this subtree becomes the child of the next set of operators corresponding to the next step. The set of fundamental XPath operators includes the following:

XPATG (XPath Attribute get): This corresponds to the step '/child:name', abbreviated as '/name'. The XPATG operator takes a relative XPath name as well as a context., e.g. /name is converted to XPATG('name', '/'); '/lineitem/name' is converted to XPATG('lineitem', '/') under_ XPATG('name', '/lineitem'); '/*' is converted to XPATG ('*', '/').

XPLIT (XPath literal): This corresponds to an XPath literal such as 'Ashanti'. This is represented as XPLIT ('Ashanti') with no operands.

XPOPR (XPath operator): This corresponds to an operator such as '=', '+', '−' etc. For example, 'li_msrp<2*li_listprice' results in XPOPR('<') with two children. The first operand is XPATG('li_msrp') and the second operand is XPOPR('*'). The latter XPOPR( ) has two children—XPLIT('2') and XPATG('li_listprice', <context>).

XPIDX (XPath Index): This corresponds to the use of indexing, e.g. '/lineitems[1]' would result in an XPIDX(1) over XPATG('lineitems').

XPPRED (XPath Predicate): This corresponds to the use of predicates, e.g. '/lineitem[li_msrp<2*li_listprice]' results in XPPRED( ) with two children. The first child is XPATG('lineitem'). The second child is an XPOPR, whose subtree corresponds to '[li_msrp<2*li_listprice]', i.e. XPOPR('<', XPATG('li_msrp', 'lineitem'), XPOPR ('*', XPLIT('2'), XPATG('li_listprice', 'lineitem')).

At the end of the expansion, the XPath expression has been converted to a tree of XPath operators, whose net effect is the same as the original XPath expression.

For example, the XPath expression '/PurchaseOrder/Address/City[Zip=94404]' can be broken down into: XPATG('PurchaseOrder', '/') under XPATG('Address', '/') under XPATG('City', '/') under XPPRED. The other child of XPPRED is an XPOPR('='). The XPOPR has two children: XPATG('Zip', 'City') and XPLIT(94404).

Elimination of Nodes on Two Trees

In step 470, the root node of the first normalized XML generation tree is used as input to a leaf node of the second tree of XML component operations on the sub-query; and it is determined whether and which nodes of the second tree eliminate a node of the first tree. Both nodes are eliminated if the two nodes represent inverse transformations or if the nodes can be replaced by an SQL operation. A node on the XML generation tree is eliminated if the current remaining XPath node does not yield a result from operating on that node of the XML generation tree. If at least one set of nodes can be eliminated, then the query can be rewritten without the node or with the corresponding SQL operation, and control passes to step 494 to rewrite the query during step 340. If no nodes, or too few nodes, can be eliminated, then control passes to step 492 to bypass rewriting of the query.

FIG. 5 is a block diagram that illustrates interoperation between a tree 590 of XML component operations that operate on the sub-query of XML generation operations and the normalized tree 510 of XML generation operations in the sub-query, according to an embodiment 500.

For purposes of illustration, it is assumed that an XML query Q1 has been received directed to XML type view dept_xv and that the query Q1 is of the form SELECT EXTRACTVALUE (value(p), /DEPT/ELIST/ENO[2]) FROM dept_xv p The XML operations in Q1 that operate on the sub-query represented by the view dept_xv are expanded to a tree 590. The leaf node of the tree is node 592 that represents extracting the node DEPT in the root context "/" using fundamental XPath operator XPATG. The parent node 594 represents getting the element ELIST, using fundamental XPath operator XPATG. Similarly, the next parent node 596 represents getting the $2^{nd}$ element of the collection of ENO elements in ELIST using fundamental XPath operator XPIDX. The root node 598 represents extracting the value at that element.

During step 470, an example node is eliminated as follows. The node 592 to get the root context element DEPT operates on node 520 to make the root context element DEPT. Because the name of the element being generated in tree 510 matches the name of the element being traversed in tree 590, the two nodes represent inverse operations and can be eliminated. The result is the set of XEL function calls at nodes 523, 524, 525, 526 that are operands of the XEL function at node 520. The XPath step at node 594 operates on the XML generation functions at these nodes 523, 524, 525, 526. Because a node can be eliminated, the query is rewritten. The remainder of the node elimination steps and the resulting rewritten query are performed during step 340.

Rewrite of XML Operations on Data not Stored as XML Types

Nodes 520 and 592 are inverse operations, as described above, and are both eliminated. The XPath step at node 594 to get element ELIST operates on the XML generation functions at nodes 523, 524, 525, 526

Node 594 to get the child element ELIST first operates on node 523 to generate the child element DNO. Because the names do not match, there is no result of this operation. Similarly, there is no result from node 594 operating on nodes 524 or 525. Nodes 523, 524, 525 and all descendents from these nodes in tree 510 are eliminated.

When node 594 operates on node 526 for generating the element ELIST the name of the element being generated matches the name of the element being traversed. The two nodes represent inverse operations and both can be eliminated. The result is the SQL query to select several rows from an underlying table. Therefore, the XPath step at node 596 to get element ENO(2) operates on the query at node 560.

Because the operand is a query, the XPath operation is performed on each XML element in the select list of the query. For example, the XPath step to get element ENO[2] operates on XEL("ENO", e.EMPNO) in the SELECT list of the query (see line 7 of Table 14). In different embodiments, this may be handled differently. In the illustrated embodiment, an indexed collection element in an XPath expression with an index greater than 1 is considered meaningful only if the XML generation operations specifies an order for elements in the collection. In the example view, an order is specified for the EMPNO values output by the query into ENO elements. Therefore the XPath expression to get the second element is reduced to an enclosing query that gets the second row in the row source.

The result of the rewrite for the example query on dept_xv is therefore:

```
SELECT (SELECT * FROM (SELECT XEL("ENO", e.empno)
    FROM emp e WHERE e.deptno=d.deptno) WHERE rownum=2)
FROM DEPT d;
```

Even though this query is not rewritten to replace all XML component operations, this rewritten query eliminated the steps to generate the ELIST and DEPT elements and the XPath steps to traverse those elements.

Other examples of rewritten XML queries are provided in the following.

A simple traversal of form

```
SELECT EXTRACT (value(p), '/DEPT/ELIST') FROM dept_xv p;
```

is rewritten from a corresponding portion of the canonicalized sub-query, resulting in the following SQL expression

```
SELECT
  (XEL("ELIST", SELECT XAG(XEL("ENO", e.EMPNO))
  FROM EMP e WHERE e.DEPTNO=d.DEPTNO)
FROM DPT d.
```

An operation to return a scalar value, such as

```
SELECT EXTRACT (value(p), '/DEPT/DNO/text( )') FROM dept_xv p; or
SELECT EXTRACTVALUE (value(p), '/DEPT/DNO') FROM dept_xv p;
```

is rewritten to obtain the value directly from the underlying table

```
SELECT d.DPTNO FROM DEPT d.
```

An operation to return a scalar value from an element that satisfies a condition predicate, such as

```
SELECT EXTRACT (value(p), '/DEPT[DNO=55]/DNAME/text( )')
FROM dept_xv p;
```

is rewritten to include the predicate in an SQL where clause using the underlying columns, such as

```
SELECT d.DPTNA FROM DEPT d WHERE d.DPTNO=55.
```

An operation to return an indexed scalar value, such as

```
SELECT EXTRACT (value(p), '/DEPT/ELIST/ENO[i]') FROM dept_xv p;
```

is rewritten to return the appropriate member of a collection, if it is possible to get the element at the position through relational operations. If the index is 1, and the element is known to be a singleton value such as an object or a scalar value, the singleton value itself is returned. Otherwise, the last indexed element is not rewritten.

Some XML operations are not reduced further in the illustrated embodiment, but may be rewritten in other embodiments. For example, the following expression is not rewritten in the illustrated embodiment, but may be rewritten in other embodiments.

```
SELECT XMLSEQUENCE (SELECT XAG("DEPTNO", XEL("ENO", e.EMPNO))
  FROM EMP e
  WHERE e.DPTNO=d.DPTNO)
FROM DPT d;
```

A predicate on a collection is rewritten in a where clause of a sub-query for generating the collection. For example, the expression

```
SELECT EXTRACT (value(p), '/DEPT/ELIST/ENO[./text( ),>39]')
  FROM dept_xv p;
```

is rewritten as.

```
SELECT
  (SELECT XAG(XEL("ENO",EMPNO))
  FROM EMP e
  WHERE e.DPTNO=d.DPTNO AND EMPNO>39)
FROM DPT d.
```

An embodiment of a rule set for converting XPath operations on canonical XML generation functions is provided in the Appendix. Further examples applying that rule set are also provided in the Appendix.

Hardware Overview

Figure 6:
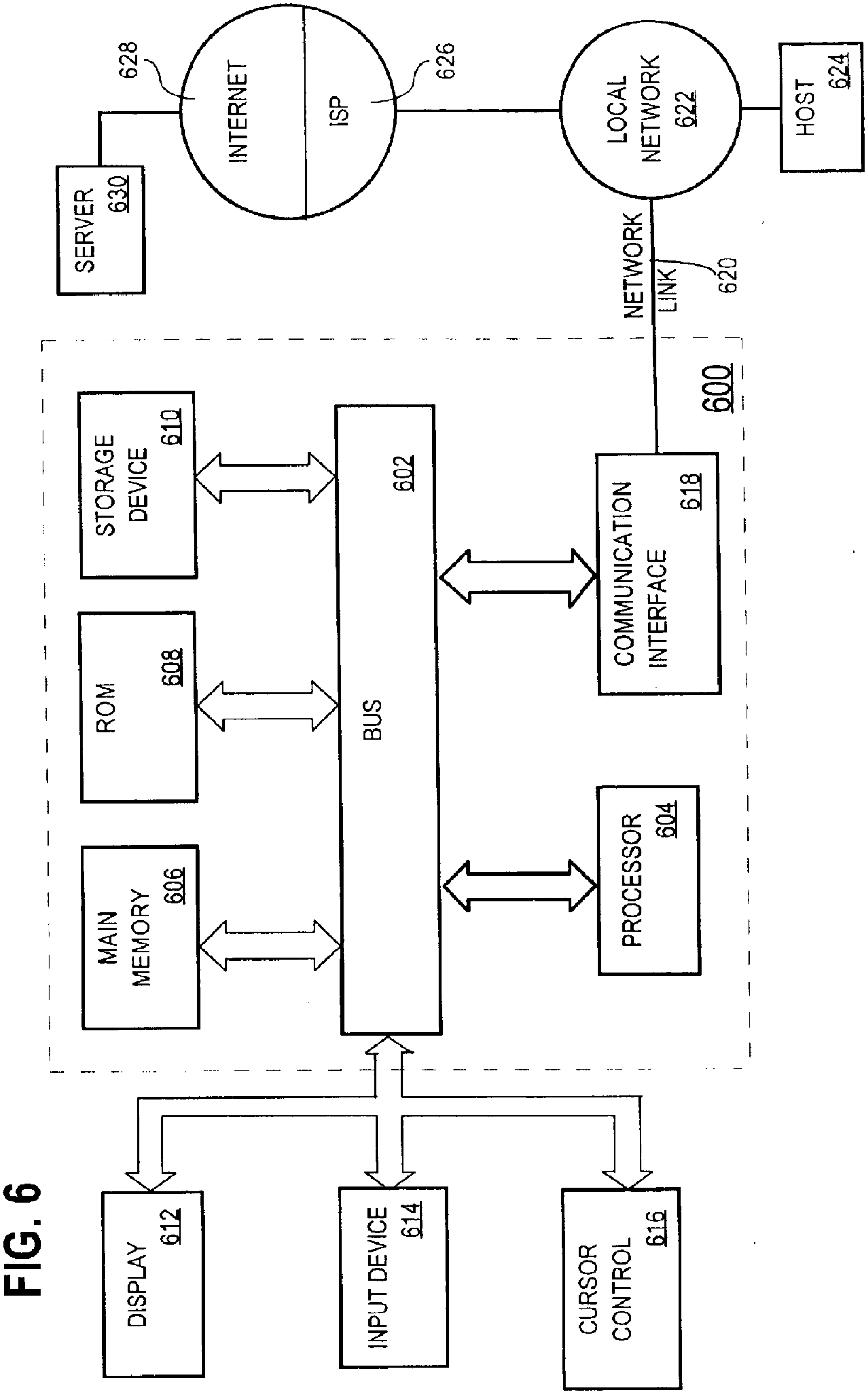
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix

Query Rewrite Optimization Rules

An embodiment of a query rewrite node elimination phase (also called herein a query rewrite optimization phase) consists of applying XPath operators in the expanded XPath operator tree to the XML Generation function tree. Along with other compile-time optimizations, the query rewrite optimization phase can reduce a complex XPath query over a view to a simpler query over the underlying relational table itself.

The query rewrite phase goes through the following rule set based on the type of XPath operation and the type of XML generation operation serving as operand for the XPath operation. It is assumed that the query has been reduced to the canonical representation, and that the Xpath expression has been expanded. In particular, it is assumed that every XEL has either a set of arguments, all of XML type, or a single argument of arbitrary type. Matching refers to the process of comparing a XPath expression element name either with a specified alias or, if an XML Schema is specified, against the name transformed according to the XML Schema. In the following, square brackets indicate optional arguments in a function call.

1. For the root XPath operator XPATG('/', '/') corresponding to the XPath expression '/':
   a. Remove the operator since it is idempotent.
2. For a child access XPath operator operating in the root context (XPATG('a', '/') corresponding to the XPath expression '/a'):
   a. If the operand is XAT, XPI, XCOM, return null.
   b. If the operand is XCDAT( ), stop rewrite.
   c. If the operand is XEL:
      i. XEL('alias', [XMLSchema,] expr 1, . . . , expr n): return self if the alias matches 'a' since this is idempotent. Otherwise, return null.
      ii. XEL(null, [XMLSchema,] scalar/adt/collection as 'alias'): if the alias does not match 'a', return null. Otherwise, return self.
      iii. XEL(null, [XMLSchema,]<xmltype_expr>): transform the tree by pushing XPATG('a', '/') to the operands of XEL. The net result will be that the Xpath operation XPATG('a', '/') will applied on each operand of XEL, and the result of the XPath operation will be passed to XEL in place of the original operand.
   d. If the operand is XAG:
      i. If an alias is specified, i.e. XAG(<xmltype-expr>as "alias"): if the alias matches 'a', return self. Otherwise, return null
      ii. If no alias is specified, i.e. XAG(<xmltype-expr>): apply the Xpath operator to the operand of XAG, i.e. XAG(XPATG('a', '/', <xmltype-expr>)).
   e. If the operand is a sub-query, apply the XPath operator to each of the items in the select list of the sub-query. Note that in the above cases, 'a' is matched against either the 'alias' itself, or against the new element name as specified by the XML Schema.
3. For a child access XPath operator operating in the context of an element (i.e. XPATG('b', '/a') corresponding to the XPath expression '/a/b'):
   a. If the operand is XAT, XPI, XCOM, return null.
   b. If the operand is XCDAT( ), stop rewrite.
   c. If the operand is XEL with an explicit alias, i.e. XEL('alias', [XMLSchema,] expr 1 . . . expr n):
      i. If the alias does not match 'a', return null.
      ii. If the XEL( ) operand has a single scalar operand, return null.
      iii. If the XEL( ) operand has a single ADT or collection operand:
         1. If an alias for the ADT or collection operand is specified: the alias will be the top-level tag for the step below.
         2. If an alias is not specified, use the type name or, if XMLSchema is specified, the name specified by the schema as the top-level tag for the step below. If the top-level tag does not match 'b', return null. Otherwise, transform it by removing the enclosing tag 'alias' in XEL. For example,
            XPATG('b', '/a', XEL('alias', [XMLSchema,] <ADT_or_collxn_operand> as "b") is transformed to
         XEL(null, [XMLSchema,]<ADT_or_collxn_operand> as "b")
      iv. Otherwise, XEL has a set of arguments of XML type: Remove the enclosing tag specified by XEL, i.e. make it XEL(null, <xmltype-expr1>, . . . , <xmltype-expn>). Then, push the XPath expression XPATG('b', '/a') to the operands of XEL.
   d. If the operator is XEL without an alias, i.e. XEL(null, [XMLSchema,] expr1 . . . expr n):
      i. If the XEL( ) operand has a single scalar operand: If the alias specified matches 'b', return self. Otherwise, return null.
      ii. If the XEL( ) operand has a single ADT operand: If the alias matches 'a', and if the ADT has a (possibly schema-transformed) attribute called 'b', transform it as follows. Otherwise, return null.
      XPATG('b', '/a', XEL(null, [XMLSchema,]<ADT_operand> as "a") becomes
      XEL(null, [XMLSchema,] OPTATG(<ADT_operand>, 'b') as 'b')
      iii. If the XEL( ) operand has a single collection operand:
         1. If an XMLSchema is not specified: if 'b' matches the alias 'a' appended with '_ITEM' (or the appropriate transformation), then follow the transformation rule below. Otherwise, return null.
            XPATG('b', '/a', XEL(null, <collection_operand> as "a") becomes
         (SELECT XAG(XEL(null, value(p) as 'b')
            ORDER BY p.<collection_index>)
         FROM table(<collection_operand>) p))
         2. If an XMLSchema is specified: if 'b' matches the name of an attribute of the collection element type of the <collection operand>, then follow the transformation rule below. Otherwise, return null.
            XPATG('b', '/a', XEL(null, XMLSchema, <collection_operand> as "a") becomes
            (SELECT XAG(XEL(null, XPATG(value(p), 'b'))
            ORDER BY p.<collection_index>)
         FROM table(<collection_operand>) p)
      iv. Otherwise, XEL has a set of arguments of XML type: push the XPath expression XPATG('b', '/a') to the operands of XEL.
   e. If the operand is XAG, apply the XPath operator to the operand of XAG.
   f. If the operand is a subquery, apply the XPath operator to each of the items in the select list of the subquery. Note that in the above cases, 'a' is matched against either the 'alias' itself, or against the new element name as specified by the XMLSchema.
4. For an index XPath operator operating in the context of an element (e.g. XPATG(i, XPATG('a', '/')) corresponding to the XPath expression '/a[i]')
   a. If the operand is XAT, XPI, XCOM, return null.
   b. If the operand is XCDAT( ), stop rewrite.
   c. If the operand is XEL, return self if i is 1. Otherwise, return null.

d. If the operand is a scalar subquery involving XAG with an explicit ORDER BY, transform it by adding a collection index match condition to the WHERE condition.

XPIDX('[i]', '/a',
(SELECT XAG(<xmltype-expr>
[ORDER BY <order-by-clause>])
FROM TABLE(<collection_operand>) p)) becomes
(SELECT XAG(<xmltype-expr>
ORDER BY p.<order-by-clause>)
FROM TABLE(<collection_operand>)p
WHERE p.<collection_index>=i)

e. If the operand is a subquery, apply the XPath operator to each of the items in the select list of the subquery.

f. Otherwise, stop rewrite.

5. For a literal XPath operator (e.g. XPLIT('1')): return the literal value (i.e. 1)

6. For a predicate XPath operator XPPRED, having two children, the second child being an XPOPR, e.g. [lineitem/li_msrp<2*(lineitem/li_listprice)] which in the expanded XPath form looks as follows:

XPOPR('<', XPATG('lineitem', 'li_msrp'),
XPOPR('*', XPLIT('2'), XPATG('lineitem', 'li_listprice')):

a. Analyze the XPOPR tree to see if the tree consists only of XPOPR, XPATG and XPLIT nodes. If so, annotate each operand to indicate whether the result is a list or not. Otherwise, stop rewrite.

b. Clone the first operand to XPPRED and add it as the child of each of the leaf-level XPATG's.

c. Remove the XPPRED node from the expanded XPath tree, making the first operand of XPPRED the child of the parent of XPPRED in place of the XPPRED node.

d. Convert the XPPRED tree to a SQL operator tree, and perform the following operations before adding it to the WHERE clause:

i. If the top-level XPPRED does not have a Boolean return value, e.g. '+', '−', create an IS NOT NULL SQL operator and make the XPPRED a child of it. If the top-level XPPRED is a Boolean function, e.g., '<', '>', then the converted SQL operator tree can be directly added to the WHERE clause.

ii. Do a breadth-first traversal of the XPPRED tree. For each XPPRED operator:

1. Check the type of the two operands of XPPRED:

a. Both are lists, i.e. <listoperand1><op><listoperand2>: replace the XPPRED with the following:

EXISTS(SELECT null FROM table (UNMAKEXML(<listoperand1>)) c
WHERE EXISTS(SELECT null FROM table (UNMAKEXML(<listoperand2>))d
WHERE (value(c)) <sqlop> (value(d))))

b. One of them is a list, i.e. <listoperand1><op><operand2>: replace the XPPRED with the following:

EXISTS(SELECT null from table (UNMAKEXML(<listoperand1>)) c WHERE (value(c))<sqlop>UNMAKEXML (<operand2>))

c. Neither is a list, i.e. <operand1><op><operand2>: replace the XPPRED with (UNMAKEXML(<operand1>) <sqlop>UNMAKEXML(<operand2>))

Note that the UNMAKEXML operator returns the scalar values in an XML instance, returning a collection of values if there is more than one scalar value in the XML instance. Note that we are converting the XPPRED node operator <op> into a SQL operator <sqlop>. e.g. we use the SQL operator '<' for XPPRED('<', . . . ).

7. For any other XPath operator, stop rewrite.

Discussion of Query Rewrite Optimization

Consider the following XML type view definition. This XML type view definition will be used as the running example for this subsection.

create type emp_t as object ( EMPNO NUMBER(4), ename VARCHAR2(10), job VARCHAR2(9), mgr NUMBER(4), HIREDATE DATE);

create type emp_list is varray(100) of emp_t;

create or replace type dept_t as object ( "@DEPTNO" NUMBER(2), DeptNAME VARCHAR2(14), LOC VARCHAR2(13), employees emp_list);

create view dept_ov of dept_t with object id (deptname) as select deptno, dname, loc, CAST(MULTISET( select emp_t(empno, ename, job, mgr, hiredate) from emp e where e.deptno=.d.deptno) AS emp_list) from dept d;

create view dept_xv of xmltype with object id(SYS_NC_ROWINFO$.extract('/ROW/@DEPTNO') .getnumberval( )) as select SYS_XMLGEN(VALUE (p)) FROM dept_ov p;

Mapping for a Simple XPath

A rewrite for a simple XPath involves accessing the attribute (object-relational column) corresponding to the XPath expression. Thus, rewrite of the expressions '/ROW/DEPTNAME', /ROW/@DEPTNO' and '/ROW/EMPLOYEES' map to dname, deptno, and CAST (MULTISET(select emp_t(empno, . . . ) from emp e where . . . ) AS emplist) respectively.

For example, consider a query that extracts the department number from the department view:

SELECT extractvalue(value(p),'/ROW/DEPTNAME') DEPARTMENTNAME from dept_xv p where extract (value(p), '/ROW/DEPTNAME').getstringval( )='SALES';

This gets rewritten into the following query:

SELECT SYS_ALIAS_1.DNAME "DEPARTMENTNAME" FROM DEPT SYS_ALIAS_1 WHERE SYS_ALIAS_1. DNAME='SALES';

Suppose a B-Tree index exists on the department number column, then that index will be picked up and an index-based search will be used to return query results. If a query such as this is evaluated without rewrite, then manifesting the XML for each row and then executing DOM operations on them can be prohibitively expensive.

Relational indexes can be used for efficient XPath retrieval. If a functional index is created on extract(value(p), '/ROW/DEPTNAME').getstringval( ), firstly, it will not be as efficient as a relational index because the relational index is likely to be more compact. Secondly, the functional index is not aware of certain metadata information, for instance, in certain implementations, the fact that only a single number, not an arbitrary XML type, is going to be returned by the extract( ) query. The functional index prevents simpler and more efficient indexes such as B-Trees to be used.

Mapping for Scalar Nodes

An XPath expression containing a text( ) operator may be rewritten into the underlying relational column. For example, consider a query that extracts the department name from the department view.

SELECT extract(value(p),'/ROW/DEPTNAME/text( )) dname

```
FROM dept_xv p, dept_xv p1
WHERE extractvalue(value(p), '/ROW/@DEPTNO')
  <extractvalue((value(p1)'/ROW/@DEPTNO)
  AND extractvalue(value(p), '/ROW/DEPTNAME')=
    extractvalue(value(p), '/ROW/DEPTNAME')
  AND extractvalue(value(p), '/ROW/LOC')=
    extractvalue(value(p), '/ROW/LOC');
```

This gets rewritten into the following query:

```
SELECT SYS_ALIAS_1.DNAME "DNAME"
FROM DEPT SYS_ALIAS_1, DEPT SYS_ALIAS_2
WHERE SYS_ALIAS_1.DNO<SYS_ALIAS_2.DNO
  AND SYS_ALIAS1.DNAME=SYS_ALIAS1.DNAME
  AND SYS_ALIAS_1.LOC=SYS_ALIAS_1.LOC;
```

Now, suppose we create a B-Tree index on <DNAME, LOC>. Creating a functional index on <extractvalue(value(p), '/ROW/DEPTNAME'), extractvalue(value(p), '/ROW/LOC')> is not likely to be as efficient, since firstly, in certain implementations, it is not known that there is a single value returned per row of the query. Secondly, more efficient query optimization algorithms such as sort-merge join may be employed to execute the query efficiently. Such techniques are only possible due to use of the additional metadata information.

Mapping of Predicates

Predicates are mapped to SQL predicate expressions. For example, consider a query that gets the number of departments called ACCOUNTING.

```
select count(*) from dept_xv e
where existsnode(value(e), '/ROW[DEPTNAME=
  "ACCOUNTING"]')=1;
```

This query gets rewritten to the following:

```
SELECT COUNT(*) "COUNT(*)" FROM DEPT
  "SYS_ALIAS_1"
WHERE "SYS_ALIAS_1". "DNAME"=
  'ACCOUNTING';
```

Simple Collection Traversals

Simple traversals through a collection are rewritten using XAG( ) to aggregate over the elements of the collection. Consider the following query, which extracts all the employee numbers from the department view. Since it needs to iterate over the elements of the collection of employees per department, an XAG is added to aggregate over the final result.

```
select extract(value(e), '/ROW/EMPLOYEES/EMP_T/
  EMPNO') empno from dept_xv e;
```

This is rewritten using XAG( ) as follows:

```
SELECT (SELECT XAG(SYS_XMLGEN(TO_CHAR
  (EMPNO))) "VALUE(P)"
  FROM EMP E
  WHERE EMPNO IS NOT NULL
    AND E.DEPTNO="SYS_ALIAS1".DEPTNO)
      "EMPNO"
FROM DEPT "SYS_ALIAS1";
```

Collection Indexing

An XPath expression can also access a particular index of a collection For example, '/ROW/EMPLOYEES/EMP_T[1]/EMPNO' is rewritten to get the first element in the employees collection of the department view, and then to get the employee number from the first element.

Predicates in Collections

An XPath expression that traverses through a collection might involve predicates. For example, the expression extract(value(p),'/ROW[EMPLOYEES/EMP_T/EMPNO>7900]') involves a comparison predicate (>7900). XPath 1.0 defines such XPaths to be satisfied if any of the items of the collection satisfies the predicate. Thus, this expression is rewritten to retrieve all those rows that have an employee collection such that at least one employee in the collection has an employee number greater than 7900. An existential check using the EXISTS( ) clause is used to get the list of all such rows.

What is claimed is:

1. A method for executing database commands that involve operations on extensible markup language (XML) constructs, comprising the computer-implemented steps of:
   - receiving a database command that includes an XML component operation that operates on an XML construct that is based on a first set of one or more relational database constructs;
   - wherein the XML component operation is a function that operates on a component identified by an XPath expression;
   - determining whether the XML component operation can be transformed to a relational database operation on a particular set of one or more relational database constructs of the first set of one or more relational database constructs, wherein the relational database operation does not involve the XML component operation; and
   - if it is determined that the XML component operation can be transformed to a relational database operation that does not involve the XML component operation, then rewriting the XML operation as a particular relational database operation that does not involve the XML component operation, and
     - evaluating the particular relational database operation on the particular set of one or more relational database constructs.

2. The method of claim 1, wherein the first set of one or more relational database constructs are XML types based on a XML schema stored in the relational database.

3. The method of claim 1, said step of determining whether the XML component operation can be transformed to a relational database operation further comprising determining whether an included XPath expression in the XML component operation is at least one of:
   - a simple XPath expression that steps along only XML nodes on child axes and attribute axes, wherein each XML node corresponds to an object type column or a scalar type column;
   - a collection traversal expression that steps along only XML nodes on child axes and attribute axes, wherein at least one XML node corresponds to a collection type column;
   - a wildcard axis expression that results in XML nodes that can all be coerced to a same data type; and
   - a descendent axis expression that results in XML nodes that can all be coerced to a same data type.

4. The method of claim 3, said step of determining whether the XML component operation can be transformed to a relational database operation further comprising determining whether the included XPath expression is used by a structured query language (SQL)/XML function.

5. The method of claim 4, wherein the SQL/XML function is at least one of EXISTSNODE, EXTRACT, and EXTRACTVALUE.

6. The method of claim 4, said step of determining whether the XML component operation can be transformed to a relational database operation further comprising determining whether the included XPath expression is used by the SQL/XML function in an SQL query in at least one of a SELECT list, a WHERE clause predicate, a GROUP BY expression, an ORDER BY expression, a FROM clause, and a HAVING clause.

7. The method of claim 4, said step of determining whether the XML component operation can be transformed to a relational database operation further comprising determining whether the included XPath expression is used by the SQL/XML function in an INDEX clause of an SQL CREATE INDEX command.

8. The method of claim 3, said step of rewriting the XML component operation further comprising rewriting a simple XPath traversal as at least one of an SQL object type accessor and an SQL scalar type accessor.

9. The method of claim 1, said step of rewriting the XML component operation further comprising rewriting a predicate in an included XPath expression as a predicate in an SQL WHERE clause.

10. The method of claim 1, said step of rewriting the XML component operation further comprising rewriting an EXISTSNODE function of an XPath expression in the database command as an IS NOT NULL test on an object type corresponding to a target of the XPath expression.

11. The method of claim 1, said step of rewriting the XML component operation further comprising rewriting a XPath traversal of a collection as a sub-query on a collection table corresponding to the collection.

12. The method of claim 1, wherein:

the one or more relational database constructs are not XML types; and said step of receiving a database command that includes an XML component operation includes receiving a database command that includes an XML component operation that operates on an XML construct that is based on an XML type sub-query over the first set of one or more relational database constructs.

13. The method of claim 1, said step of determining whether the XML component operation can be transformed further comprising expanding the XML component operation to a tree of XPath operators that each represent one location step in an XPath expression included in the XML component operation.

14. The method of claim 12, said step of receiving a database command that includes an XML component operation that operates on the XML construct that is based on the XML type sub-query further comprising retrieving the sub-query from an XML type view over the first set of one or more relational database constructs.

15. The method of claim 12, said step of determining whether the XML component operation can be transformed further comprising the steps of:

determining a primitive set of XML generation operations for generating any XML construct from any relational database construct;

determining whether the XML type sub-query involves a particular XML generation operation that is not a member of the primitive set; and if it is determined that the database command involves the particular XML generation operation that is not a member of the primitive set, then determining a particular set of one or more XML generation operations from the primitive set that produces a same result as the particular XML generation operation, and using the particular set of one or more XML generation operations from the primitive set to determine whether the XML component operation can be transformed.

16. The method of claim 15, said step of determining whether the XML component operation can be transformed further comprising expanding the XML component operation to a tree of XPath operators that each represent one location step in an XPath expression included in the XML component operation.

17. The method of claim 16, said step of determining whether the XML component operation can be transformed further comprising forming a normalized tree of one or more XML generation operations based on the particular set of one or more XML generation operations from the primitive set, wherein a normalized tree of one or more XML generation operations contains XML generation operations from the primitive set that each operate on only one of a single scalar operand, a single abstract data type operand, or a set of one or more XML type operands.

18. The method of claim 17, said step of determining whether the XML component operation can be transformed further comprising determining whether a particular node of the tree of XPath operators operating on a particular node of the normalized tree of XML generation operations corresponds to a particular SQL operation on a particular column of the first set of relational database constructs.

19. The method of claim 17, said step of determining whether the XML component operation can be transformed further comprising determining whether a particular node of the tree of XPath operators corresponds to an inverse operation for a particular node of the normalized tree of XML generation operations.

20. The method of claim 18, said step of rewriting further comprising replacing the XPath operation corresponding to the particular node of the tree of XPath operators and the XML generation operation corresponding to the particular node of the tree of XML generation operations with the particular SQL operation on the particular column.

21. The method of claim 19, said step of rewriting further comprising eliminating the XPath operation corresponding to the particular node of the tree of XPath operators and eliminating the XML generation operation corresponding to the particular node of the tree of XML generation operations.

22. The method of claim 18, said step of determining whether the XML component operation can be transformed further comprising applying an appropriate rule from a rule set for replacing a single step XPath operator operating on an XML generation operation of the primitive set.

23. The method of claim 11, said step of rewriting the XML component operation further comprising adding a predicate in the XPath traversal of the collection to a WHERE clause of the sub-query on the collection table.

24. A computer-implemented method for executing database commands that involve generating an extensible markup language (XML) type from relational database constructs, comprising the steps of:

determining a primitive set of XML generation operations for generating any XML construct from a relational database construct;

determining whether a database command involves a particular XML generation operation that is not a member of the primitive set; and if it is determined that the database command involves the particular XML generation operation that is not a member of the primitive set, then determining a particular set of one or more XML generation operations from the primitive set that produces a same result as the particular XML generation operation, and using the particular set of one or more XML generation operations from the primitive set to evaluate the database command.

25. A computer-readable storage medium carrying one or more sequences of instructions for executing database commands that involve operations on extensible markup language (XML) constructs, wherein execution of the one or more sequences of instructions by one or more processors causes the one or more processors to perform the steps of:

receiving a database command that includes an XML component operation for an XML document based on one or more relational database constructs; wherein the XML component operation is a function that operates on a component identified by an XPath expression;

determining whether the XML component operation can be transformed to a relational database operation on a particular set of one or more relational database constructs of the set of one or more relational database constructs, wherein the relational database operation does not involve the XML component operation; and if it is determined that the XML component operation can be transformed to a relational database operation that does not involve the XML component operation, then rewriting the XML component operation to a particular relational database operation that does not involve the XML component operation, and evaluating the particular relational database operation on the particular set of one or more relational database constructs.

26. A computer-readable storage medium carrying one or more sequences of instructions for executing database commands that involve generating an extensible markup language (XML) type from relational database constructs, wherein execution of the one or more sequences of instructions by one or more processors causes the one or more processors to perform the steps of:

determining a primitive set of XML generation operations for generating any XML construct from a relational database construct;

determining whether a database command involves a particular XML generation operation that is not a member of the primitive set; and if it is determined that the database command involves the particular XML generation operation that is not a member of the primitive set, then determining a particular set of one or more XML generation operations from the primitive set that produces a same result as the particular XML generation operation, and using the particular set of one or more XML generation operations from the primitive set to evaluate the database command.

27. The computer-readable storage medium of claim 25, wherein the first set of one or more relational database constructs are XML types based on a XML schema stored in the relational database.

28. The computer-readable storage medium of claim 25, said step of determining whether the XML component operation can be transformed to a relational database operation further comprising determining whether an included XPath expression in the XML component operation is at least one of:

a simple XPath expression that steps along only XML nodes on child axes and attribute axes, wherein each XML node corresponds to an object type column or a scalar type column;

a collection traversal expression that steps along only XML nodes on child axes and attribute axes, wherein at least one XML node corresponds to a collection type column;

a wildcare axis expression that results in XML nodes that can all be coerced to a same data type; and a descendent axis expression that results in XML nodes that can all be coerced to a same data type.

29. The computer-readable storage medium of claim 28, said step of determining whether the XML component operation can be transformed to a relational database operation further comprising determining whether the included XPath expression is used by a structured query language (SQL)/XML function.

30. The computer-readable storage medium of claim 29, wherein the SQL/XML function is at least one of EXISTSNODE, EXTRACT, and EXTRACTVALUE.

31. The computer-readable storage medium of claim 29, said step of determining whether the XML component operation can be transformed to a relational database operation further comprising determining whether the included XPath expression is used by the SQL/XML function in an SQL query in at least one of a SELECT list, a WHERE clause predicate, a GROUP BY expression, an ORDER BY expression, a FROM clause, and a HAVING clause.

32. The computer-readable storage medium of claim 29, said step of determining whether the XML component operation can be transformed to a relational database operation further comprising determining whether the included XPath expression is used by the SQL/XML function in an INDEX clause of an SQL CREATE INDEX command.

33. The computer-readable storage medium of claim 28, said step of rewriting the XML component operation further comprising rewriting a simple XPath traversal as at least one of an SQL object type accessor and an SQL scalar type accessor.

34. The computer-readable storage medium of claim 25, said step of rewriting the XML operation further comprising rewriting a predicate in an included XPath expression as a predicate in an SQL WHERE clause.

35. The computer-readable storage medium of claim 25, said step of rewriting the XML component operation further comprising rewriting an EXISTSNODE function of an XPath expression in the database command as an IS NOT NULL test on an object type corresponding to a target of the XPath expression.

36. The computer-readable storage medium of claim 25, said step of rewriting the XML component operation further comprising rewriting a XPath traversal of a collection as a sub-query on a collection table corresponding to the collection.

37. The computer-readable storage medium of claim 25, wherein:

the one or more relational database constructs are not XML types; and said step of receiving a database command that includes an XML component operation includes receiving a database command that includes an XML component operation that operates on an XML construct that is based on an XML type sub-query over the first set of one or more relational database constructs.

38. The computer-readable storage medium of claim 25, said set of determining whether the XML component operation can be transformed futhter comprising expanding the XML component operation to a tree of XPath operators that each represent one location step in an XPath expression included in the XML component operation.

39. The computer-readable storage medium of claim 37, said step of receiving a database command that includes an XML component operation that operates on the XML construct that is based on the XML type sub-query futher comprising retrieving the sub-query from an XML type view over the first set of one or more relational database constructs.

40. The computer-readable storage medium of claim 37, said step of determining whether the XML component operation can be transformed further comprising the steps of:

determining a primitive set of XML generation operations for generating any XML construct from any relational database construct;

determining whether the XML type sub-query involves a particular XML generation operation that is not a member of the primitive set; and if it is determined that the database command involves the particular XML generation operation that is not a member of the primitive set, then determining a particular set of one or more XML generation operations from the primitive set that produces a same result as the particular XML generation operation, and using the particular set of one or more XML generation operations from the primitive set to determine whether the XML component operation can be transformed.

41. The computer-readable storage medium of claim 40, said step of determining whether the XML component operation can be transformed further comprising expanding the XML component operation to a tree of XPath operators that each represent one location step in an XPath expression included in the XML component operation.

42. The computer-readable storage medium of claim 41, said step of determining whether the XML component operation can be transformed further comprising forming a normalized tree of one or more XML generation operations based on the particular set of one or more XML generation operations from the primitive set, wherein a normalized tree of one or more XML generation operations contains XML generation operations from the primitive set that each operate on only one of a single scalar operand, a single abstract data type operand, or a set of one or more XML type operands.

43. The computer-readable storage medium of claim 42, said step of determining whether the XML component operation can be transformed further comprising determining whether a particular node of the tree of XPath operators operating on a particular node of the normalized tree of XML generation operations corresponds to a particular SQL operation on a particular column of the first set of relational database constructs.

44. The computer-readable storage medium of claim 42, said step of determining whether the XML component operation can be transformed further comprising determining whether a particular node of the tree of XPath operators corresponds to an inverse operation for a particular node of the normalized tree of XML generation operations.

45. The computer-readable storage medium of claim 43, said step of rewriting further comprising replacing the XPath operation corresponding to the particular node of the tree of XPath operators and the XML generation corresponding to the particular node of the tree of XML generation operations with the particular SQL operation on the particular column.

46. The computer-readable storage medium of claim 44, said step of rewriting further comprising eliminating the XPath operation corresponding to the particular node of the tree of XPath operators and eliminating the XML generation operation corresponding to the particular node of the tree of XML generation operations.

47. The computer-readable storage medium of claim 43, said step of determining whether the XML component operation can be transformed further comprising applying an appropriate rule from a rule set for replacing a single step XPath operator on an XML generation operation of the primitive set.

48. The computer-readable storage medium of claim 36, said step of rewriting the XML component operation further comprising adding a predicate in the XPath traversal of the collection to a WHERE clause of the sub-query on the collection table.

* * * * *

UNITED STATES PATENT AND TRADEMARK OFFICE

CERTIFICATE OF CORRECTION

PATENT NO. : 7,120,645 B2
APPLICATION NO. : 10/428878
DATED : October 10, 2006
INVENTOR(S) : Anand Manikutty et al.

It is certified that error appears in the above-identified patent and that said Letters Patent is hereby corrected as shown below:

COLUMN 32

Claim 1: Line 28, delete “XML operation” and insert --XML component operation--.

COLUMN 34

Claim 24: Line 48, delete “A computer-implemented method” and insert --A method--.

COLUMN 36

Claim 38: Line 60, delete “futhter” and insert --further--.

Claim 39: Line 67, delete “futher” and insert --further--.

COLUMN 38

Claim 45: Line 18, delete “generation corresponding” and insert --generation operation corresponding--.

Claim 47: Line 31, delete “operator on” and insert --operator operating on--.

Signed and Sealed this

Second Day of January, 2007

JON W. DUDAS
*Director of the United States Patent and Trademark Office*